(12) United States Patent
Cuervo Laffaye et al.

(10) Patent No.: US 10,200,261 B2
(45) Date of Patent: Feb. 5, 2019

(54) MULTIPLE-COMPUTING-NODE SYSTEM JOB NODE SELECTION

(71) Applicant: Microsoft Technology Licensing, LLC, Redmond, WA (US)

(72) Inventors: Eduardo A. Cuervo Laffaye, Bellevue, WA (US); David Chiyuan Chu, Redmond, WA (US); Kaifei Chen, Berkeley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 222 days.

(21) Appl. No.: 14/701,188

(22) Filed: Apr. 30, 2015

(65) Prior Publication Data

US 2016/0323161 A1    Nov. 3, 2016

(51) Int. Cl.
    *H04L 12/26*     (2006.01)
    *G06F 9/50*      (2006.01)
    *H04L 29/08*     (2006.01)

(52) U.S. Cl.
    CPC ............ *H04L 43/08* (2013.01); *G06F 9/5044* (2013.01); *H04L 67/1002* (2013.01); *Y02D 10/22* (2018.01)

(58) Field of Classification Search
    CPC .............................. H04L 43/08; G06F 9/5044
    USPC ........................................................ 709/224
    See application file for complete search history.

(56) References Cited

U.S. PATENT DOCUMENTS

| | | | |
|---|---|---|---|
| 7,401,012 B1 | 7/2008 | Bonebakker et al. | |
| 7,882,251 B2 | 2/2011 | Banes et al. | |
| 7,991,633 B2 | 8/2011 | Baker et al. | |
| 8,561,074 B2 | 10/2013 | Cherkasova et al. | |
| 8,656,404 B2 | 2/2014 | Greene et al. | |
| 8,695,009 B2 | 4/2014 | Vojnovic et al. | |
| 9,292,350 B1 * | 3/2016 | Pendharkar | G06F 9/5044 |
| 2009/0287744 A1 | 11/2009 | Bernardini et al. | |

(Continued)

FOREIGN PATENT DOCUMENTS

GB     2357863 A       7/2001
WO    WO2014189899 A1  11/2014

OTHER PUBLICATIONS

Papadopoulos, "Beyond Beowulf Clusters", ACM Queue, Apr. 2007 (8 pages).*

(Continued)

*Primary Examiner* — Wing F Chan
*Assistant Examiner* — Leon Y Tseng

(57) ABSTRACT

Nodes of a computing cluster can be selected to run new computing jobs while providing acceptable performance of jobs running on the nodes. Respective performance metrics of respective workloads on respective computing nodes can be determined. Each workload can include a new computing job and the performance metrics can be determined based at least in part on respective measured performance data of the ones of the computing nodes and information of the new computing job. Candidate ones of the computing nodes can be determined based at least in part on the respective performance metrics. One of the candidate computing nodes can be selected based at least in part on the information of the new computing job. In some examples, identification of the new computing job can be transmitted to the selected node. In some examples, state data of the nodes can be updated based on the performance data.

20 Claims, 7 Drawing Sheets

(56) References Cited

U.S. PATENT DOCUMENTS

| | | | |
|---|---|---|---|
| 2011/0307899 A1* | 12/2011 | Lee | G06F 9/5027 718/104 |
| 2013/0191843 A1 | 7/2013 | Sarkar et al. | |
| 2013/0346614 A1* | 12/2013 | Baughman | G06F 9/5083 709/226 |
| 2016/0283139 A1* | 9/2016 | Brooker | G06F 3/0619 |

OTHER PUBLICATIONS

Bode et al., "The Portable Batch Scheduler and the Maui Scheduler on Linux Clusters", in the Proceedings of the 4th Annual Linux Showcase & Conference, Oct. 2000, 10 pages.

Cagier et al., "iOverbook: Managing Cloud-based Soft Real-time Applications in a Resource-Overbooked Data Center", in the Proceedings of the 20th IEEE Real-time and Embedded Technology and Applications Symposium, Apr. 2014, 10 pages.

Ferdaus et al., "Virtual Machine Consolidation in Cloud Data Centers using ACO Metaheuristic", in Euro-Par 2014 Parallel Processing, Springer International Publishing, Aug. 2014, 12 pages.

Grandl et al., "Multi-Resource Packing for Cluster Schedulers", in the Proceedings of the 2014 ACM Conference on SIGCOMM, Aug. 2014, 12 pages.

Mehta et al., "Dynamic Resource Mangement Heuristics for Minimizing Makespan while Maintaining an Acceptable Level of Robustness in an Uncertain Environment", in the Proceedings of the 12th IEEE International Conference on Parallel and Distributed Systems, Jan. 2006, 26 pages.

Yu et al., "Cost-based Scheduling of Scientific Workflow Applications on Utility Grids", in the Proceedings of the First International Conference on the e-Science and Grid Computing, Dec. 2005, 8 pages.

Zacharuiasen, Martin "Minimum Makespan Scheduling", published on Dec. 4, 2006, available at «http://www.diku.dk/OLD/undervisning/2006-2007/2006-2007_b2_415/msappr.pdf>>, 12 pages.

PCT Search Report and Written Opinion dated Jun. 16, 2016 for PCT Application No. PCT/US16/026300, 10 Pages.

PCT Written Opinion of the International Preliminary Examining Authority for PCT application No. PCT/US2016/026300, 6 pages. dated Apr. 3, 2017.

"International Preliminary Report on Patentability Issued in PCT Application No. PCT/US2016/026300", dated Jun. 30, 2017, 7 Pages.

* cited by examiner

MULTIPLE-COMPUTING-NODE SYSTEM JOB NODE SELECTION

BACKGROUND

Interconnected, intercommunicating computing devices are used to implement cluster computing systems ("computing clusters" or "clusters") where several discrete computing nodes work together to accomplish a computing task assigned to the cluster as a whole. Some such systems can have all, or a portion of the cluster deployed in the cloud. Cloud computing allows for computing resources to be provided as services rather than a deliverable product. For example, in a cloud-computing environment, computing power, software, information, and/or network connectivity are provided (for example, through a rental agreement) over a network, such as the Internet.

Cluster computing requires performing management functions on each cluster, such as service deployment and monitoring. These are generally performed by cluster management software or logic (an "agent") running on one or more of the computing nodes or other computing devices of or connected to the cluster. For example, users can submit computing jobs to a cluster as a whole, and the cluster management software will determine which node of the cluster should execute the job. Different jobs have different demands for computing resources such as processor cycles, memory, disk storage, and network bandwidth. Moreover, long-running jobs such as remote-desktop sessions can have resource demands that vary over time while the job is running. Clusters can be evaluated based on adherence to service-level agreements (SLAs) that specify the required job performance a customer requires a cluster to deliver. Various prior schemes sum resource requirements of individual jobs running on a node to estimate whether a new job can be added to that node. However, the total resource utilization of jobs on a node can be greater than the sum of utilization values of the jobs run individually. Running more jobs on a node can increase, e.g., paging, swapping, bus contention, or graphics processing unit (GPU) contention, reducing performance of that node and possibly causing a violation of SLAs.

SUMMARY

This disclosure describes systems, methods, and computer-readable media for selecting specific computing nodes, e.g., in a computing cluster, to run particular computing jobs. In some examples, a cluster-management agent (CMA) can receive information of a new computing job to be run on a node in the cluster. The CMA can also receive measured performance data of individual nodes in the cluster. The CMA can use a statistical model to determine performance metrics of the nodes running workloads including the new computing job. The CMA can then determine candidate computing nodes based at least in part on the performance metrics, and select one of the candidate computing nodes based at least in part on the information of the new computing job. According to example techniques described herein, the CMA can determine the respective performance metric for at least one of the computing nodes further based at least in part on a stored regression model. The CMA can determine the candidate ones of the computing nodes by comparing performance values for selected computing jobs in the workload to respective job-performance criteria. The CMA can assign individual ones of the computing nodes to respective ones of a plurality of sub-clusters based at least in part on the respective performance metrics of the ones of the computing nodes.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, can refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
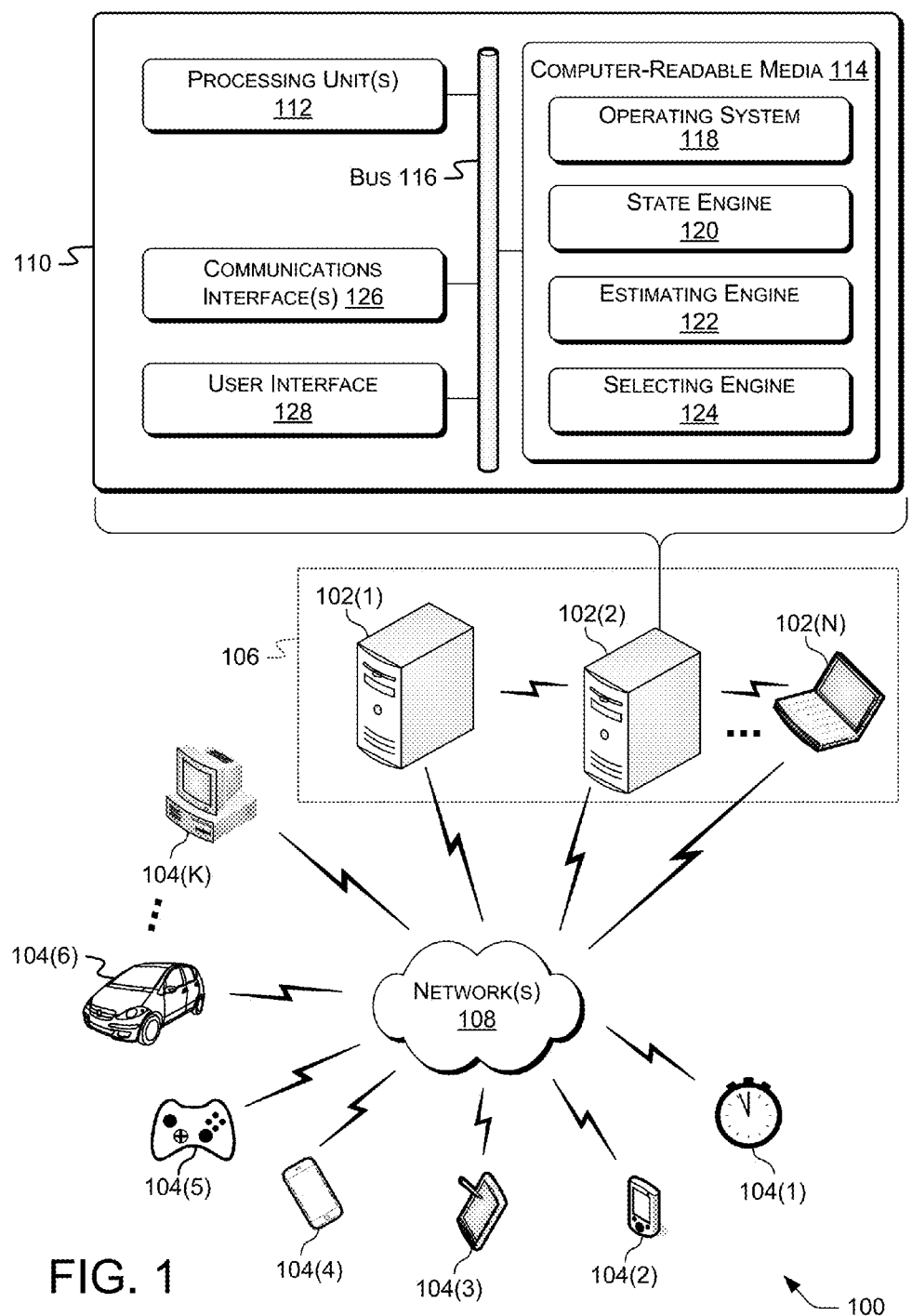
FIG. 1 is a block diagram depicting an example environment for implementing cluster computing and computing job node selection as described herein.

Examples described herein provide techniques and constructs to improve the selection of computing nodes to run computing jobs by more effectively determining which nodes have sufficient resource capacity to effectively execute the jobs. The computing nodes can be included, e.g., in a cluster such as a cloud service. The determination of which nodes have capacity permits managing a cluster to more effectively meet service-level agreements (SLAs). More efficiently distributing jobs to nodes as described herein can provide reduced power consumption of the cluster by more effectively using fewer nodes to meet SLAs. As used herein, the terms "service-level expectations" and "SLEs" refer to performance expectations or requirements placed on a cluster, e.g., to requirements set forth in an SLA (though no formal SLA is required). Failure of a cluster computing service to meet its SLEs may reduce usability of, or user satisfaction with, the cluster computing service. For example, a cloud gaming service providing framerates lower than an SLE of 30 frames per second (fps) may not be acceptable to players of first-person games hosted by the service.

Some examples described herein can improve the functioning of computing-cluster technology independently of the types of jobs run on the cluster. Some examples herein can provide a job allocation that achieves acceptable streaming performance (e.g., for gaming) while maintaining high utilization of nodes in a computing cluster. Some examples herein can reduce the number of nodes required to execute a set of jobs compared to prior schemes, which can reduce operational expenditures (OpEx), by reducing the number of node powered up at any given time and thus reducing the power consumption of the cluster, or capital expenditures (CapEx), by permitting an expected level of demand for cluster services to be satisfied using fewer nodes.

As used herein, the term "computing" used with reference to clusters, nodes, and jobs refers generally to computation, data manipulation, or other programmatically-controlled operations. The term "resource" used with reference to clusters, nodes, and jobs refers generally to any commodity or service provided by the cluster for use by jobs. For example, computing jobs can include heavily processor-intensive operations such as computing large numbers of digits of π. Computing jobs can additionally or alternatively include memory-intensive operations such as rotating image data for inkjet printing, streaming video from main memory or network-interface memory to graphics-processor memory, or computing memory-based hashcash for sending verified emails. Computing jobs can additionally or alternatively include disk-intensive operations such as running complex database queries over large datasets striped over numerous hard drives. Computing jobs can additionally or alternatively include network-intensive operations such as shuffling data between many map nodes and many reduce nodes between phases of a map/reduce process. Computing jobs can additionally or alternatively use relatively small amounts of various resources, e.g., a network time-of-day service. Resources can include processor cycles, disk space, random-access memory space, network bandwidth (uplink, downlink, or both), prioritized network channels such as those used for communications with quality-of-service (QoS) guarantees, backup tape space or mounting/unmounting services, electrical power, etc.

As used herein, the term "workload" represents a collection of one or more jobs being executed on a particular computing node at a given time, or being considered for such execution.

As used herein, the term "sub-cluster" refers to a subset of the computing nodes in a computing cluster that have similar properties as described herein. A sub-cluster can have a "sub-cluster head node," which is one of the computing nodes in the sub-cluster chosen to represent the computing nodes in the sub-cluster. The term "sub-clustering" refers to the process of assigning computing nodes to sub-clusters in a computing cluster.

In some examples, statistical modeling can be used to estimate the performance of computing jobs on a node when a new computing job is added to that node, e.g., alongside existing jobs. For example, regression analysis can be used, taking state or profiling variables or counters of the node as input and providing expected performance as output. The expected performance can then be compared to a threshold to determine whether the new computing job can be added to that node without causing SLE violations of any of the running jobs. This process can be repeated for multiple nodes to find candidate nodes that can accept the new computing job while maintaining SLE performance.

Various environments, configurations of electronic devices, and methods for managing computing jobs in a computing cluster are described further with reference to FIGS. 1-8. While many examples described herein relate to servers and other non-consumer electronic devices, other types of electronic devices can be used, e.g., as discussed with reference to FIG. 1.

Illustrative Environment

FIG. 1 shows an example environment 100 in which examples of cluster systems can operate or in which per-job node-selection methods such as those described herein can be performed. In the illustrated example, the various devices and/or components of environment 100 include computing device(s) 102(1)-102(N) (individually or collectively referred to herein with reference 102), where N is any integer greater than or equal to 1, and computing devices 104(1)-104(K) (individually or collectively referred to herein with reference 104), where K is any integer greater than or equal to 1. In some examples, N=K; in other examples, N>K or N<K. Although illustrated as, e.g., desktop computers, laptop computers, tablet computers, or cellular phones, computing device(s) 102 or 104 can include a diverse variety of device categories, classes, or types and are not limited to a particular type of device. In the illustrated example, computing device(s) 102(1)-102(N) can be computing nodes in a cluster 106, e.g., a cloud service such as MICROSOFT AZURE. In the illustrated example, computing device(s) 104 can be clients of cluster 106 and can submit jobs to cluster 106 and/or receive job results from cluster 106. Computing devices 102(1)-102(N) in cluster 106 can, e.g., share resources, balance load, increase performance, or provide fail-over support or redundancy. Computing devices 104 can additionally or alternatively operate in a cluster or grouped configuration.

By way of example and not limitation, computing device(s) 102 or 104 can include, but are not limited to, server computers or blade servers such as Web servers, map/reduce servers or other computation engines, or network-attached-storage units (e.g., 102(1)), laptop computers, thin clients, terminals, or other mobile computers (e.g., 102(N)), wearable computers such as smart watches or biometric or medical sensors, implanted computing devices such as biometric or medical sensors (e.g., 104(1), represented graphically as a clock), computer navigation client computing devices, satellite-based navigation system devices including global positioning system (GPS) devices and other satellite-based navigation system devices (e.g., 104(2), represented graphically as a PDA), tablet computers or tablet hybrid computers (e.g., 104(3)), smartphones, mobile phones, mobile phone-tablet hybrid devices, or other telecommunication devices (e.g., 104(4)), portable or console-based gaming devices or other entertainment devices such as network-enabled televisions, set-top boxes, media players, cameras, or personal video recorders (PVRs) (e.g., 104(5), represented graphically as a gamepad), automotive computers such as vehicle control systems, vehicle security systems, or electronic keys for vehicles (e.g., 104(6), represented graphically as an automobile), personal data assistants (PDAs), desktop computers (e.g., 104(K)), or integrated components for inclusion in computing devices, appliances, or other computing device(s) configured to participate in or carry out cluster management as described herein, e.g., for node selection purposes. In some examples, as indicated, computing device(s), e.g., computing devices 102(1) and 102(2), can intercommunicate to participate in or carry out node selection for a computing job as described herein. For example, computing device 102(1) can be a host-management agent (HMA) and computing device 102(2) can be a cluster-management agent (CMA) that selects nodes in the cluster to run jobs. Individual nodes can have HMAs that report the nodes' performance values to the CMA and that execute jobs as directed by the CMA. A cluster can have one or more CMAs. For example, a 100-node cluster can have two CMAs that load-balance node-selection processing between them.

Different devices or types of computing devices 102 and 104 can have different needs or ways of interacting with cluster 106. For example, computing devices 104(1) can interact with cluster 106 with discrete request/response communications, e.g., for time synchronization, such as via the Network Time Protocol (NTP). In some examples, computing devices 104(K) can serve as clients for remote-login or remote-desktop interactions, such as the MICROSOFT WINDOWS Remote Desktop Protocol (RDP) or the X WINDOW SYSTEM core protocol. Such interactions can support, for example, line-of-business (LOB) applications such as word-processors or spreadsheets, or games such as low-bandwidth turn-based games or high-end games (HEG) such as first-person exploration games. In remote-desktop interactions, the communications between computing device 104(K) and computing devices 102 in cluster 106 can be constrained to have at least a certain bandwidth and/or at most a certain latency. In an example, of a 50 ms latency requirement, 30 ms can be consumed by end-to-end network transmission and only 20 ms available for processing on a computing device 102. These and other jobs run on the cluster 106 can have soft real-time requirements. Jobs can only run for a short time, e.g., a finger daemon or print spooler run on demand, or can run for long periods of time, e.g., an RDP session.

In some examples, computing devices 102 or 104 can communicate with each other or with other computing devices via one or more network(s) 108. In some examples, computing devices 102 and 104 can communicate with external devices via network(s) 108. For example, network(s) 108 can include public networks such as the Internet, private networks such as an institutional or personal intranet, or combination(s) of private and public networks. Private networks can include isolated networks not connected with other networks, such as MODBUS, FIELDBUS, or Industrial Ethernet networks used internally to factories for machine automation. Private networks can also include networks connected to the Internet or other public network(s) via network address translation (NAT) devices, firewalls, network intrusion detection systems, or other devices that restrict or control the types of network packets permitted to flow between the private network and the public network(s). Network(s) 108 can also include any type of wired or wireless network, including but not limited to local area networks (LANs), wide area networks (WANs), satellite networks, cable networks, Wi-Fi networks, WiMAX networks, mobile communications networks (e.g., 3G, 4G, and so forth) or any combination thereof. Network(s) 108 can utilize communications protocols, such as, for example, packet-based or datagram-based protocols such as Internet Protocol (IP), Transmission Control Protocol (TCP), User Datagram Protocol (UDP), other types of protocols, or combinations thereof. Moreover, network(s) 108 can also include a number of devices that facilitate network communications or form a hardware infrastructure for the networks, such as switches, routers, gateways, access points, firewalls, base stations, repeaters, backbone devices, and the like. Network(s) 108 can also include devices that facilitate communications between computing devices 102 or 104 using bus protocols of various topologies, e.g., crossbar switches, INFINIBAND switches, or FIBRE CHANNEL switches or hubs.

Different networks have different characteristics, e.g., bandwidth, latency, accessibility (open, announced but secured, or not announced), or coverage area. The type of network 108 used for any given connection between, e.g., a computing device 104 and cluster 106 can be selected based on these characteristics and on the type of interaction. For example, a low-latency network can be selected for high-end game interactions.

In some examples, network(s) 108 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), other standards, e.g., BLUETOOTH, cellular-telephony standards such as GSM, LTE, or WiMAX, or multiples or combinations thereof.

Details of an example computing device 102(2) are illustrated at inset 110. The details of example computing device 102(2) can be representative of others of computing device(s) 102, 104. However, each of the computing device(s) 102 or 104 can include additional or alternative hardware and/or software components. Still referring to the example of FIG. 1, computing device 102(2) can include one or more processing unit(s) 112 operably connected to one or more computer-readable media 114 such as via a bus 116, which in some instances can include one or more of a system bus, a data bus, an address bus, a Peripheral Component Interconnect (PCI) Express (PCIe) bus, a PCI bus, a Mini-PCI bus, and any variety of local, peripheral, or independent buses, or any combination thereof. In some examples, plural processing units 112 can exchange data through an internal interface bus (e.g., PCIe), rather than or in addition to network 108. While the processing units 112 are described as residing on the computing device 102(2), in this example, the processing units 112 can also reside on different computing device(s) 102 or 104 in some examples. In some examples, at least two of the processing units 112 can reside on different computing device(s) 102 or 104. In such examples, multiple processing units 112 on the same computing device 102 or 104 can use a bus 116 of the computing device 102 or 104 to exchange data, while processing units 112 on different computing device(s) 102 or 104 can exchange data via network(s) 108.

Computer-readable media 114 can store, for example, computer-executable instructions of an operating system 118, a state engine 120, an estimating engine 122, a selecting engine 124, and/or other modules, programs, or applications that are loadable and executable by processing unit(s) 112. In some examples not shown, one or more of the processing unit(s) 112 in one of the computing device(s) 102 or 104 can be operably connected to computer-readable media 114 in a different one of the computing device(s) 102 or 104, e.g., via communications interface 126 and network 108. For example, program code to perform steps of flow diagrams herein, e.g., to interact with state engine 120, can be downloaded from a server, e.g., computing device 102(1), to a client, e.g., computing device 104(K), e.g., via the network 108, and executed by one or more processing unit(s) 112 in computing device 104(K). For example, the computer-executable instructions stored on the computer-readable media 114 can upon execution configure a computer such as a computing device 102 or 104 to perform operations described herein with reference to the operating system 118, the state engine 120, the estimating engine 122, or the selecting engine 124.

Processing unit(s) 112 can be or include one or more single-core processors, multi-core processors, central processing units (CPUs), GPUs, general-purpose graphics processing units (GPGPUs), or hardware logic components configured, e.g., via specialized programming from modules or APIs, to perform functions described herein. For example, and without limitation, illustrative types of hardware logic components that can be used in or as processing units 112 include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and other types of customizable processors. For example, a processing unit 112 can represent a hybrid device, such as a device from ALTERA or XILINX that includes a CPU core embedded in an FPGA fabric. These or other hardware logic components can operate independently or, in some instances, can be driven by a CPU. In some examples, at least some of computing device(s) 102 or 104 can include a plurality of processing units 112 of multiple types. For example, the processing units 112 in computing device 102(2) can be a combination of one or more GPGPUs and one or more FPGAs. Different processing units 112 can have different execution models, e.g., as is the case for graphics processing units (GPUs) and central processing unit (CPUs).

Throughout this disclosure, the term "node" refers to a device or portion of a device manageable separately from other nodes in a cluster. In some examples, each computing device 102 can have exactly one single-core processing unit 112. Each such computing device 102 can be or embody a node in this example. In some examples, a single computing device 102 can have a plurality of multi-core processing units 112. In such examples, each core of the multi-core processing units 112 can be a node, or each multi-core processing unit 112 can be a node. Other combinations, and points between these extremes, can also be used. For example, an individual processing unit 112 (e.g., an FPGA) can include one or more nodes. In other examples, multiple cores of one or more processing unit(s) 112 can be configured to operate together as a single node.

Computing device 102 can also include one or more communications interfaces 126 to enable wired or wireless communications between computing device(s) 102 or 104 and other networked computing devices 102 or 104 involved in cluster computing, or other computing device(s), over network(s) 108. Such communications interface(s) 126 can include one or more transceiver devices, e.g., network interface controllers (NICs) such as Ethernet NICs or other types of transceiver devices, to send and receive communications over a network. The processing units 112 can exchange data through respective communications interface(s) 126. In some examples, the communications interface 126 can be a PCI Express (PCIe) transceiver, and the network 108 can be a PCIe bus. In some examples, the communications interface 126 can include, but is not limited to, a transceiver for cellular (3G, 4G, or other), WI-FI, Ultra-wideband (UWB), BLUETOOTH, or satellite transmissions. The communications interface 126 can include a wired I/O interface, such as an Ethernet interface, a serial interface, a Universal Serial Bus (USB) interface, an INFINIBAND interface, or other wired interfaces. For simplicity, these and other components are omitted from the illustrated computing device 102(2).

Computer-readable media described herein, e.g., computer-readable media 114, include computer storage media and/or communication media. Computer storage media includes tangible storage units such as volatile memory, nonvolatile memory, and/or other persistent and/or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, and/or storage media that can be used to store and maintain information for access by a computing device 102 or 104.

In contrast to computer storage media, communication media can embody computer-readable instructions, data structures, program modules, or other data in a modulated data signal, such as a carrier wave, or other transmission mechanism. As defined herein, computer storage media does not include communication media.

In some examples, computer-readable media 114 can store instructions executable by the processing unit(s) 112 that, as discussed above, can represent a processing unit incorporated in computing device 102. Computer-readable media 114 can additionally or alternatively store instructions executable by external processing units such as by an external CPU or external processor of any type discussed above. In some examples at least one processing unit 112, e.g., a CPU, GPU, or hardware logic device, can be incorporated in computing device 102, while in some examples at least one processing unit 112, e.g., one or more of a CPU, GPU, or hardware logic device, can be external to computing device 102.

Computer-readable media 114 of the computing device 102 can store an operating system 118. In some examples, operating system 118 is not used (commonly referred to as a "bare metal" configuration). In some examples, operating system 118 can include components that enable or direct the computing device 102 to receive data via various inputs (e.g., user controls, network or communications interfaces, memory devices, or sensors), and process the data using the processing unit(s) 112 to generate output. The operating system 118 can further include one or more components that present the output (e.g., display an image on an electronic display, store data in memory, and/or transmit data to another computing device). The operating system 118 can enable a user, e.g., a cluster administrator, to interact with the computing device 102(2) using a user interface 128. Additionally, the operating system 118 can include components that perform various functions generally associated with an operating system, e.g., storage management and internal-device management.

In some examples, computing device 102 or 104 can include user interface 128. User interface 128 can include one or more output devices configured for communication to a user or to another computing device 102 or 104. Output devices can be integral or peripheral to computing device 102 or 104. Examples of output devices can include a display, a printer, audio speakers, beepers, or other audio output devices, a vibration motor, linear vibrator, or other haptic output device, and the like. User interface 128 can include one or more input devices, integral or peripheral to computing device 102 or 104. The input devices can be user-operable, or can be configured for input from other computing device 102 or 104. Examples of input devices can include, e.g., a keyboard, keypad, a mouse, a trackball, a pen sensor or smart pen, a light pen or light gun, a game controller such as a joystick or game pad, a voice input device such as a microphone, voice-recognition device, or speech-recognition device, a touch input device, a gestural input device such as a touchscreen, a grip sensor, an accelerometer, another haptic input, a visual input device such as one or more cameras or image sensors, and the like.

Illustrative Components

Figure 2:
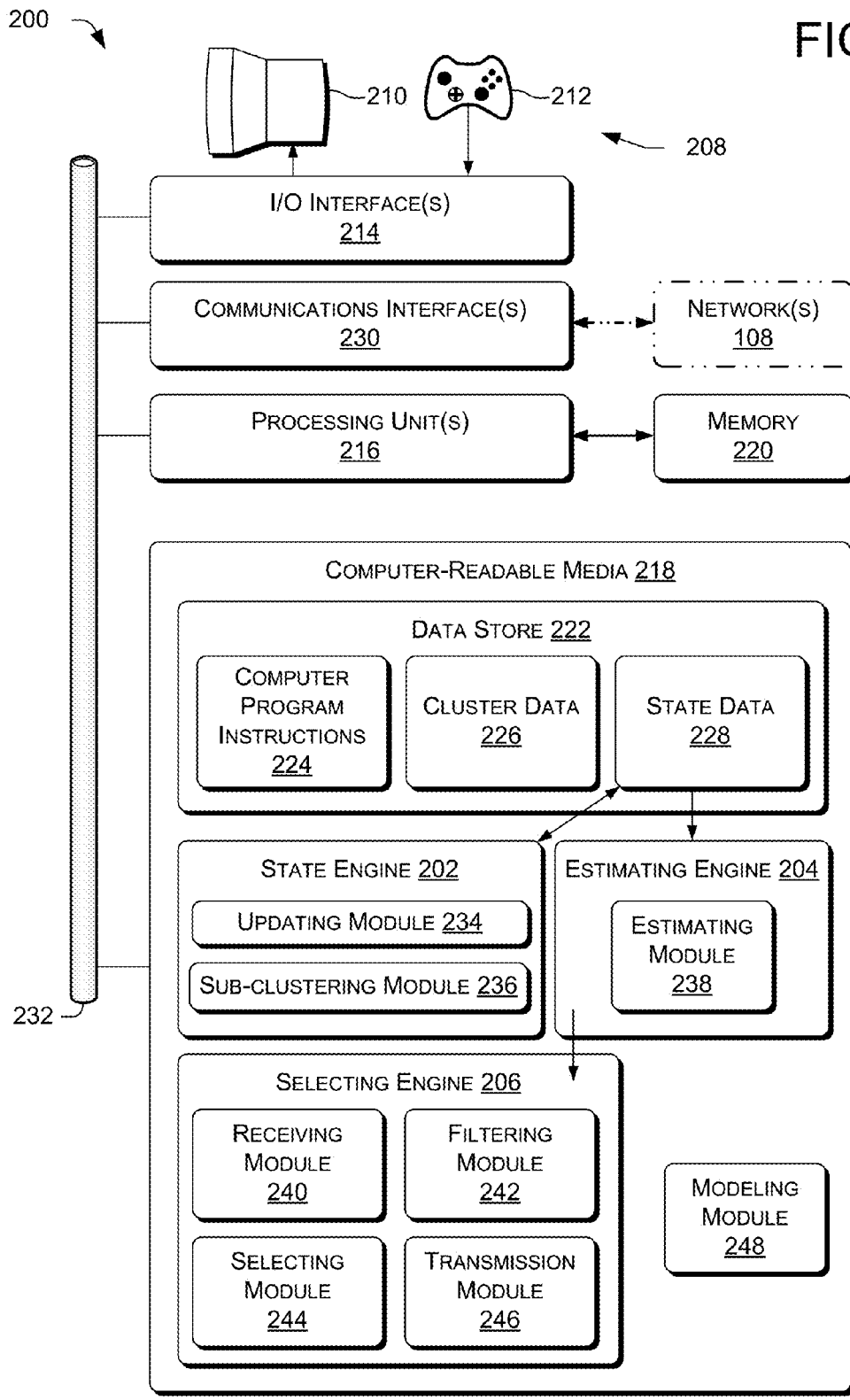
FIG. 2 is a block diagram depicting an example computing device configured to participate in computing job node selection according to various examples described herein.

FIG. 2 is an illustrative diagram that shows example components of an computing device 200, which can represent computing device(s) 102 or 104, and which can be or implement a CMA, HMA, or cluster client, according to various examples described herein. In the illustrated example, computing device 200 implements functions of a CMA. Computing device 200 can implement a state engine 202, which can represent state engine 120, FIG. 1. Computing device 200 can implement an estimating engine 204, which can represent estimating engine 122, FIG. 1. Computing device 200 can implement a selecting engine 206, which can represent the selecting engine 124, FIG. 1.

Computing device 200 can include or be connected to a user interface 208, which can represent user interface 128. User interface 208 can include a display 210. Display 210 can include an organic light-emitting-diode (OLED) display, a liquid-crystal display (LCD), a cathode-ray tube (CRT), or another type of visual display. Display 210 can be a component of a touchscreen, or can include a touchscreen. User interface 208 can include various types of output devices described above with reference to user interface 128.

User interface 208 can include a user-operable input device 212 (graphically represented as a gamepad). User-operable input device 212 can include various types of input devices described above with reference to user interface 128.

Computing device 200 can further include one or more input/output (I/O) interface(s) 214 to allow computing device 200 to communicate with input, output, or I/O devices (for clarity, some not depicted). Examples of such devices can include components of user interface 208 such as user-operable input devices and output devices described above with reference to user interface 128. Other examples of such devices can include power meters, temperature sensors, and other devices for measuring properties of computing device 200 or its environment or of another computing device 102 or 104. Computing device 200 can communicate via I/O interface 214 with suitable devices or using suitable electronic/software interaction methods. Input data, e.g., of user inputs on user-operable input device 212, can be received via I/O interface(s) 214, and output data, e.g., of user interface screens, can be provided via I/O interface(s) 214 to display 210, e.g., for viewing by a user.

The computing device 200 can include one or more processing unit(s) 216, which can represent processing unit(s) 112. Processing units 216 can be operably coupled to the I/O interface 214 and to at least one computer-readable media 218, discussed below. Processing unit(s) 216 can include, e.g., processing unit types described above such as CPU- or GPGPU-type processing unit(s). In some examples, processing unit(s) 216 can include or be connected to a memory 220, e.g., a random-access memory (RAM) or cache.

In some examples, computer-readable media 218 of the computing device 200 can store a plurality of modules of the state engine 202, the estimating engine 204, or the selecting engine 206. Processing unit(s) 216 can be configured to execute modules of the plurality of modules. For example, the computer-executable instructions stored on the computer-readable media 218 can upon execution configure a computer such as a computing device 200 to perform operations described herein with reference to the modules of the plurality of modules. The modules stored in the computer-readable media 218 can include instructions that, when executed by the one or more processing units 216, cause the one or more processing units 216 to perform operations described below. Examples of modules in computer-readable media 218 are discussed below. Computer-readable media 218 can also include an operating system, e.g., operating system 118. Computer-readable media 218 can be computer storage media, as discussed above.

In the illustrated example, computer-readable media 218 includes a data store 222. In some examples, data store 222 can include data storage, structured or unstructured, such as a database (e.g., a Structured Query Language, SQL, or NoSQL database) or data warehouse. In some examples, data store 222 can include a corpus or a relational database with one or more tables, arrays, indices, stored procedures, and so forth to enable data access. Data store 222 can store data for the operations of processes, applications, components, or modules stored in computer-readable media 218 or computer instructions in those modules executed by processing unit(s) 216. In some examples, the data store can store computer program instructions 224 (e.g., instructions corresponding to client monitoring code, to processes described herein, or to other software executable by processing unit(s) 216), cluster data 226, state data 228, or any combination thereof. In some examples, state data 228 can be used in determining which node should execute a new job. Data store 222 can store state data 228 of one or more nodes in one or more clusters, e.g., of a plurality of computing nodes. State data 228 can include, e.g., measured performance data of nodes, e.g., performance metrics such as frame rate, frame time, or latency, and/or values derived therefrom. In some examples, cluster data 226 can include operational data of the cluster, e.g., which jobs are currently executing on which nodes, or which resources are reserved or available in the cluster or its nodes. In some examples, the cluster data 226 and the state data 228 can be stored in a single or combined dataset.

The computing device 200 can also include a communications interface 230, which can represent communications interface 126. For example, communications interface 230 can include a transceiver device such as a network interface controller (NIC) to send and receive communications over a network 108 (shown in phantom), e.g., as discussed above. As such, the computing device 200 can have network capabilities. For example, the computing device 200 can exchange data with computing devices 102 or 104 (e.g., laptops, computers, and/or servers) via one or more network(s) 108, such as the Internet.

In some examples, the processing unit(s) 216 can access the module(s) on the computer-readable media 218 via a bus 232, which can represent bus 116, FIG. 1. I/O interface 214 and communications interface 230 can also communicate with processing unit(s) 216 via bus 232.

The modules of the state engine 202 stored on computer-readable media 218 can include one or more modules, e.g., shell modules, or application programming interface (API) modules) which are illustrated as an updating module 234 and a sub-clustering module 236.

The modules of the estimating engine 204 stored on computer-readable media 218 can include one or more modules, e.g., shell modules, or application programming interface (API) modules) which are illustrated as an estimating module 238.

The modules of the selecting engine 206 stored on computer-readable media 218 can include one or more modules, e.g., shell modules, or application programming interface (API) modules) which are illustrated as a receiving module 240, a filtering module 242, a selecting module 244, and a transmission module 246.

In the state engine 202, the estimating engine 204, or the selecting engine 206, the number of modules can vary higher or lower, and modules of various types can be used in various combinations. For example, functionality described associated with the illustrated modules can be combined to be performed by a fewer number of modules or APIs or can be split and performed by a larger number of modules or APIs. For example, the filtering module 242 and the selecting module 244 can be combined in a single module that performs at least some of the example functions described below of the modules. In some examples, computer-readable media 218 can include a subset of modules 234, 236, 238, 240, 242, 244, and 246.

In some examples, the computer-readable media 218 can further include a modeling module 248. The modeling module 248 is discussed below with reference to FIG. 4.

Figure 3:
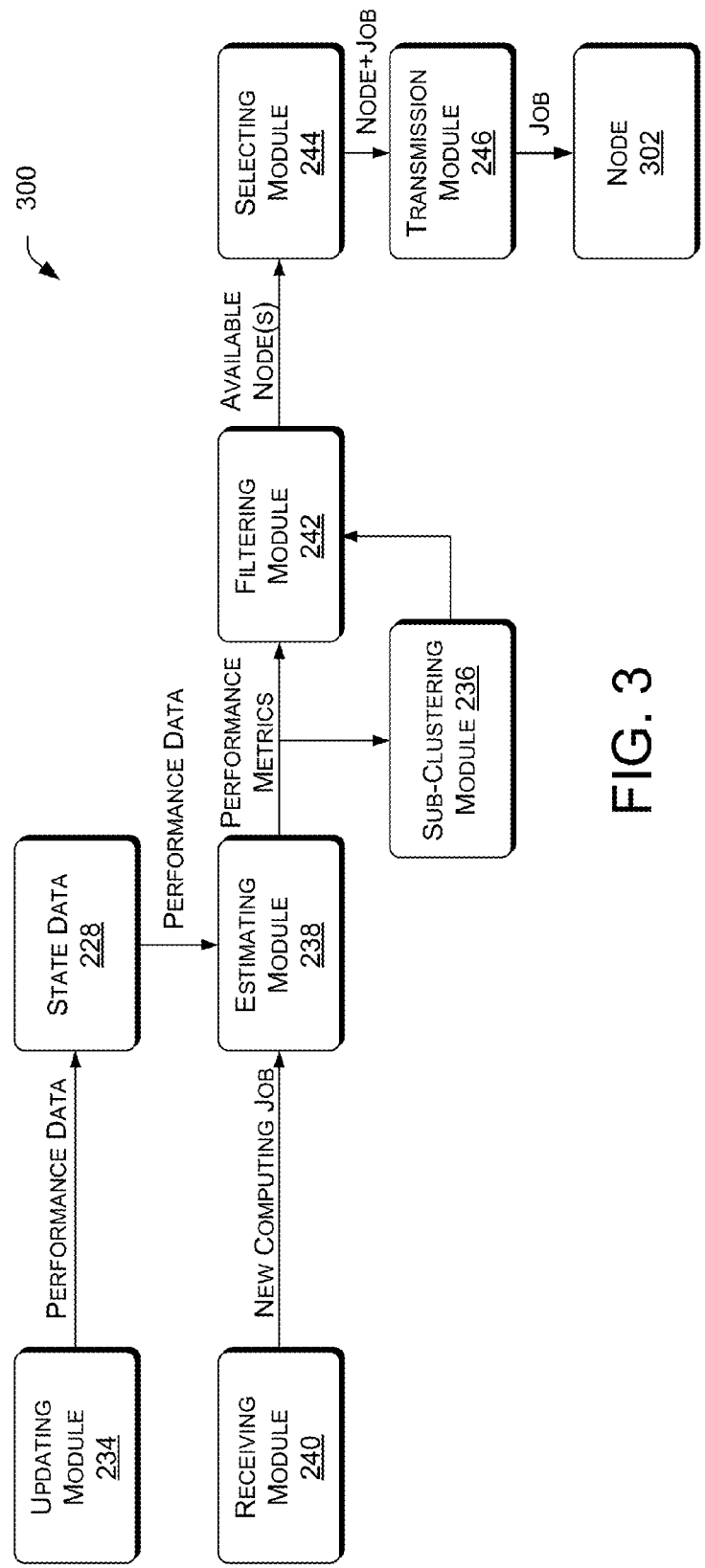
FIG. 3 is a dataflow diagram depicting example module interactions during selection of a computing node to run a computing job.

FIG. 3 is a dataflow diagram 300 illustrating example interactions between the modules illustrated in FIG. 2.

In some examples, the receiving module 240 can be configured to receive, via the communications interface 230, a request to run a new computing job. The receiving module 240 can provide information of the new job to the estimating module 238. The information of the new job can include, e.g., an identifier (ID) of the job's program code such as a universally-unique identifier (UUID), information about what resources the job requires, or an indication that the job is present or has been requested.

The estimating module 238 can be configured to determine respective performance metrics of respective workloads on respective computing nodes 302, e.g., computing devices 102, FIG. 1. The respective workloads can include a new computing job, e.g., a job newly requested by a computing device 104. The estimating module 238 can be configured to determine the respective performance metrics based at least in part on respective measured performance data of the ones of the computing nodes 302 and on information of the new computing job. The measured performance data or values derived therefrom can be, e.g., provided by the receiving module 240, retrieved from state data 228 or another a database or data store, or otherwise obtained. For example, the estimating module 238 can be configured to retrieve at least some of the respective measured performance data of the at least some of the computing nodes 302 from the computer-readable media 218, FIG. 2. The measured performance data can include, e.g., present usage or supply of one or more resources, or other data described below. The measured performance data can also include or be based on processed data, e.g., values derived from the measured data such as statistics of the measured data. For example, the average CPU usage on a node 302, in percent, can be included in the measured performance data for that node 302.

In some examples, the estimating module 238 can be configured to determine the respective performance metrics only for respective computing nodes 302 that meet administrative criteria. For example, some jobs can require specific hardware only present on some nodes. The estimating module 238 can omit nodes 302 lacking the specific hardware from the list of computing nodes 302 for which performance metrics are determined. In other examples, some jobs can require exclusive use of a full node. Some jobs can require exclusive use of a GPU, GPU core, CPU, or CPU core, e.g., to reduce the probability of disclosure of sensitive cryptographic information. The estimating module 238 can omit nodes 302 not able to satisfy those requirements from the list of computing nodes 302 for which performance metrics are determined.

The filtering module 242 can be configured to determine candidate ones of the computing nodes 302, e.g., computing devices 102. The filtering module can be configured to make this determination based at least in part on the respective performance metrics from the estimating module 238.

The selecting module 244 can be configured to select one of the candidate computing nodes 302 indicated by the filtering module 242. The selecting module 244 can be configured to make this selection based at least in part on the information of the new computing job. In some examples, the selecting module 244 can be further configured to select the one of the candidate computing nodes based at least in part on the measured performance data and/or on availability of resources required by the new computing job. Determining the candidate ones of the computing nodes 302 before selecting one to run the job can provide reduced probability of SLE violation and reduce the time required for the selecting module 244 to select a computing node 302 to run the new computing job.

In some examples, the transmission module 246 receives the selection from the selecting module 244. The transmission module 246 can be configured to transmit an indication of the new computing job to the selected one of the candidate computing nodes 302, e.g., via the communications interface 230.

In some examples, the updating module 234 can be configured to receive measured performance data from one or more of the computing nodes 302 via a communications interface such as communications interface 230. The updating module 234 can be configured to update the corresponding state data 228 based at least in part on the received measured performance data. In some examples, the updating module 234 can be configured to store updated performance data of at least some of the computing nodes in the computer-readable media 218, FIG. 2.

In some examples, the sub-clustering module 236 can be configured to assign individual ones of the computing nodes to respective ones of a plurality of sub-clusters based at least in part on the respective performance metrics of the ones of the computing nodes. In some of these examples, the sub-clustering module 236 can be further configured to select respective sub-cluster head nodes for individual sub-clusters of the plurality of sub-clusters from the respective computing nodes in the individual sub-clusters. The filtering module 242 can be configured to determine first ones of the candidate ones of the computing nodes 302 from among the sub-cluster head nodes and then to determine second ones of the candidate ones of the computing nodes 302 from the sub-clusters to which the determined first ones of the candidate ones of the computing nodes are assigned. An example is discussed below with reference to FIG. 6. Sub-clustering can be performed using conventional unsupervised-learning or other statistical clustering techniques.

In some examples, the selecting module 244 can be configured to rank the candidate computing nodes 302 and then to select a highest-ranked or high-ranked one of the candidate computing nodes 302 as the one of the candidate computing nodes 302. In some examples, the selecting module 244 can rank the candidate computing nodes 302 based at least in part on network latency between the client, e.g., a computing device 104, FIG. 1, and the candidate computing node 302 or a sub-cluster of which the candidate computing node 302 is part. This can permit reducing overall latency, e.g., of remote desktop sessions or high-end games. In some examples using sub-clustering, the selecting module 244 can rank the candidate computing nodes 302 based at least in part on the overall load of the sub-cluster of which each candidate computing node 302 is part.

In some examples, multiple selecting modules 244 can operate in parallel. In some examples, an explicit coordination protocol such as Paxos can be used to coordinate operations between multiple CMAs. In other examples, multiple CMAs can make machine selection decisions in a distributed and independent fashion. In some examples, the selecting module 244 in a CMA can determine a ranked list of the computing nodes 302 and select the highest-ranked computing node 302 on the list that has not been modified by another CMA.

For example, an individual CMA (e.g., the selecting module 244) can update an "entity tag" (etag) (or last-edit timestamp or other modification indication, and likewise throughout) of a node 302 when selecting that node 302 to run a new job. The etag can be stored in a database or other data store implementing concurrency control to prevent simultaneous updates of the etags by more than one CMA. The estimating module 238 can retrieve the etags for the nodes 302 from the database and provide the etags with the respective performance metrics. The filtering module 242 can likewise provide the etags from the estimating module 238 to the selecting module 244. Before selecting a node 302 to run the new computing job, the CMA can retrieve the etag for that node 302 from the database. If the etags match, that CMA can select that node 302 to run the new computing job. This match indicates that the actual workload of that node 302 corresponds to the respective workload of that node 302 used by the estimating module 238 in determining the respective performance metrics of that node 302. If the etags do not match, another CMA has placed a job on that node 302 since the respective performance metrics were determined, so the performance metrics for that node can no longer reflect the ability of that node 302 to meet SLEs while running the new computing job. Accordingly, the CMA detecting the etag mismatch can check the etag of the next-highest-ranked node 302 in the ranked list, and so forth, and select the first-encountered node 302 that has matching etags to run the new computing job. Conventional concurrency protocols such as critical sections can be implemented to reduce the probability of race conditions between CMAs.

Figure 4:
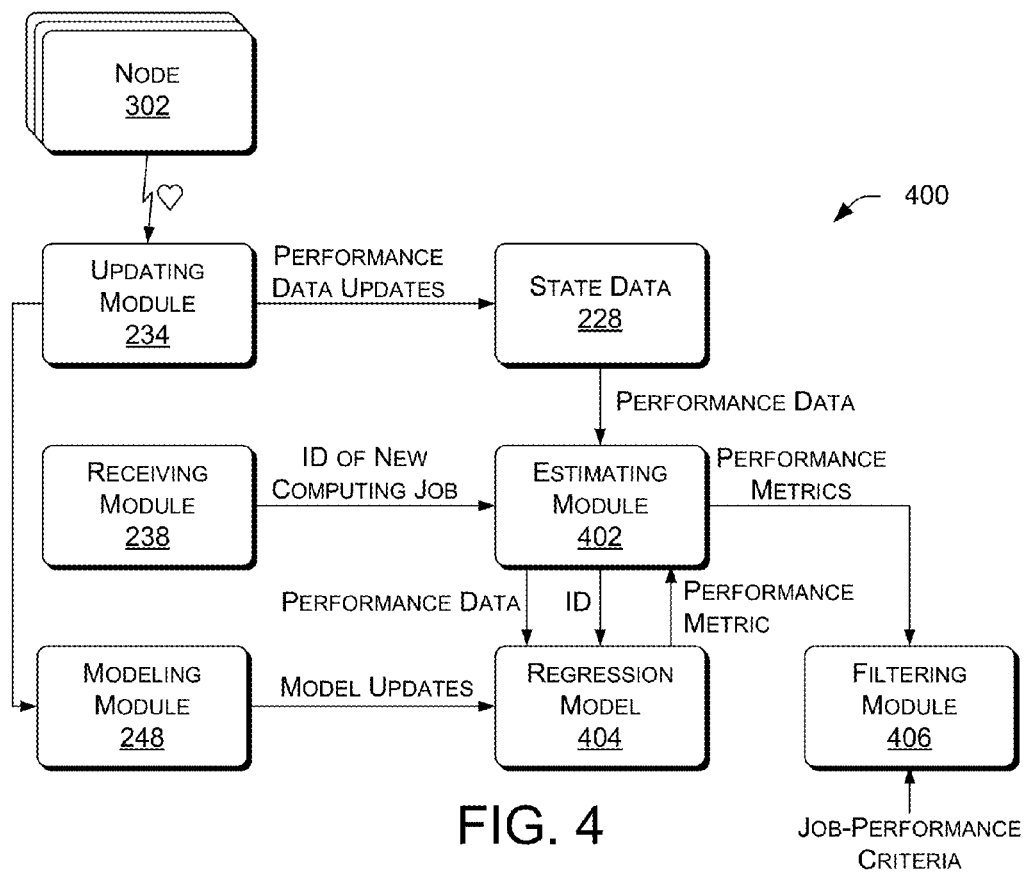
FIG. 4 is a dataflow diagram depicting example module interactions during selection of a computing node to run a computing job.

FIG. 4 is a dataflow diagram 400 illustrating example techniques for determining performance metrics such as those discussed above with reference to FIG. 3. An estimating module 402, which can represent estimating module 238, FIG. 2, can be configured to determine the respective performance metric for at least one of the computing nodes 302, FIG. 3.

The estimating module 402 determines the performance metric further based at least in part on a stored regression model 404. The regression model 404 is shown separately from the state data 228 for clarity of explanation, but can be stored within or as part of the state data 228 or elsewhere in data store 222 or computer-readable media 218 (both FIG. 2). The regression model 404 has as input at least some of the measured performance data for a given node. For example, at least one of the input variables ("regressors" or "independent variables") can be included in the performance data. At least one of the response variables ("regressands" or "dependent variables") can include a performance metric. In some examples, the regression model 404 can further have as input at least some of the information of the new computing job, e.g., an identifier of the new computing job. In some examples, the regression model 404 can further have as input estimated or measured demand information of the new computing job, e.g., as discussed below with reference to FIG. 5.

In the illustrated example, the computing nodes 302 in the cluster periodically communicate state information to the updating module 234. This state information can include, e.g., CPU load or other items such as those listed in Tables 1 and 2, below. The updating module 234 stores this state information in the state data 228. Some of the example state information listed in Table 1 applies to hypervisor systems in which operating systems (OSs) run in virtual machines (VMs). For example, the ANDROID operating system can be run as a guest OS on a WINDOWS host OS. Table 1 lists "dynamic" state, i.e., state information relatively more likely to change at runtime. Table 2 lists "static" state, i.e., state information relatively less likely to change at runtime. However, the division of the state information between Tables 1 and 2 is purely for clarity of exposition and is not limiting. Moreover, the specific items listed in Tables 1 and 2 are not limiting.

In an example, nodes 302 can communicate state information as part of a recurrent "heartbeat" transmission (graphically indicated using a heart symbol) that indicates to the cluster-management agent (CMA) that the node 302 is running and able to process jobs. For example, the state information can be transmitted to the CMA approximately once per second. In some examples, different portions of the state information listed in Table 1 and 2 can be transmitted at different times or with different frequencies, or can be retrieved from a memory instead of or in addition to being transmitted. For example, the number of CPUs in a given node 302 (Table 2) can be looked up in an equipment database rather than being transmitted by node 302. In another example, the number of CPUs can be transmitted by node 302. In some examples, the state information can be transmitted as a set of key-value pairs. In some examples, the nodes 302 can transmit state information separately from heartbeat signals or transmissions, or in a combination of heartbeat and non-heartbeat signals or transmissions.

In some examples, the state data 228 and the estimating module 402 can be embodied in a single computing device 200. This provides the estimating module 402 access to recent information about the current state of the nodes 302 in the cluster without requiring a network round-trip at the time that recent information is needed.

TABLE 1

Example dynamic state information

| | |
|---|---|
| Host OS | GPU Core clock (MHz) |
| Guest OS identifiers per VM | GPU Memory clock (MHz) |
| App names or identifiers of running jobs | GPU Shader clock (MHz) |
| Process ID and port number of a process running the job | Hard drive remaining life (hours, days, . . .) |
| | Hard drive space used, free (bytes) |
| CPU load per core, package, app (%) | Hard drive temperature |
| CPU clock speed (MHz) | Frame rate per app (Frames per second) |
| CPU bus speed (MHz) | Frame time statistics per app (ms) |
| CPU Temperature (degrees) per core, package | Render process % CPU per app |
| CPU Power (Watts) per core, package, on-chip RAM | VM process % CPU per app |
| | Load on each VM virtual processor |
| Memory load (%) | Packets sent on the hypervisor switch (#), per port or aggregate |
| Memory used, available (bytes) | |
| GPU temperature | Packets received on the hypervisor switch (#), per port or aggregate |
| GPU fan speed | |
| GPU Core load (%) | Bytes sent on the hypervisor switch, per port or aggregate |
| GPU Memory load (%) | |
| GPU Video engine load (%) | Bytes received on the hypervisor switch, per port or aggregate |
| GPU Memory controller load (%) | |

TABLE 2

Example static state information

| | |
|---|---|
| Node size bucket (e.g., in a cloud service) | CPU cache sizes |
| Number of CPUs | GPU numbers and types |
| Number of cores per CPU | CUDA/OpenCL core count per GPU |
| Number of concurrent threads on hyperthreaded CPUs | Base & Boost clock speeds per GPU |
| | Rated Texture fill rate per GPU |
| Rated clock speed per CPU | Rated GPU memory speed, size, bandwidth |
| Rated turbo frequency per CPU | |

In the illustrated example, the receiving module 240 receives a request to run a new computing job. The request includes an identifier of the job, e.g., an app ID or other UUID, a JAVA package name or other reverse domain name, or a path and filename of an executable file containing an entry point of the job. The receiving module 240 provides the ID to the estimating module 402. The estimating module 402 can retrieve performance data of a node 302, e.g., historical performance data, from the state data 228. The estimating module 402 can then provide the performance data and the ID as inputs to the regression model 404. The regression model 404 can return a performance metric indicating, representative of, or correlated with the expected performance of node 302 if the new job were to be run on that node 302, e.g., along with one or more other job(s) currently running on that node 302.

The estimating module 402 can repeat this process in series, parallel, or any combination thereof for multiple nodes 302 to provide the respective performance metrics of the respective workloads on the respective nodes 302. The nodes 302 can have different performance metrics since any node 302 can be running different jobs than are the other nodes 302 at any given time. Information about which jobs are currently running on nodes 302 can be provided by the nodes 302 as indicated in Table 1 ("identifiers of running jobs") and/or can be retrieved from a central database of node selections.

In some examples, the estimating module 402 can provide the performance data but not any information of the new computing job to the regression model 404. This can reduce the processing required to estimate performance in systems in which all jobs have generally the same performance characteristics.

In some examples, the estimating module 402 can provide any or all of the performance data, the ID of the new computing job, and additional information of the new computing job to the regression model 404. For example, estimating module 402 can provide to the regression model 404 identification of the user requesting the new computing job (e.g., a userid), a category of user (e.g., professional, home, gamer), or operational information of the app (e.g., which level of a game the user is on, or whether the user is viewing or editing a slideshow). User category information can be provided by users or inferred from the behavior of a user's jobs. For example, users whose jobs generally use high amounts of a GPU can be categorized as professional users or gamers, depending on the type of jobs that user generally runs (e.g., computer-aided design or HEG). User category information can also be determined based on data provided by a user, e.g., as part of a smartphone setup process.

In some examples, nodes 302 can provide at least some of the state information for one or more running jobs. In some examples, the number of partial feature vectors sent at each heartbeat by a particular node 302 can be equal to the number of apps running on that node 302. In some examples, regression can be performed separately to determine the performance of each app in a new workload, by adding the new app to each partial feature vector in turn, and successively plugging the resulting complete feature vectors into the regression model.

In some examples, the respective workloads of nodes 302 include the new computing job and one or more existing computing jobs. The estimating module 402 determines the respective performance metrics for nodes 302 including respective performance values corresponding to the new computing job and one or more respective performance values corresponding to respective ones of the existing computing jobs in the respective workload. Before a particular node 302 is selected to run the new computing job, it can be determined whether that node 302 is capable of continuing to run any existing jobs on that node 302 as well as running the new computing job while meeting the relevant SLEs.

In some of these examples, accordingly, the filtering module 406, which can represent the filtering module 242, FIG. 2, can be configured to determine the candidate ones of the computing nodes 302 by comparing one or more of the performance values for selected ones of the computing jobs, new or existing, in the respective workloads to respective job-performance criteria. For example, the jobs can be remote-desktop sessions. The performance values can be respective frame rates for the jobs (e.g., frames per second, fps). The job-performance criteria can specific required frame rates, e.g., 30 fps for high-end games and 15 fps for line-of-business applications. The filtering module 406 can determine that a node 302 is a candidate if the estimated performance for a job, as provided by the estimating module 402, meets or exceeds the respective job-performance criterion or criteria. In some examples, the performance values can be processing latency values (e.g., in ms). For a remote-desktop session, the latency can be measured as the time duration from when a user input is received via the network 108 until data of a video frame responsive to that input is transmitted via the network 108.

In some examples, the filtering module 406 can additionally or alternatively track historical performance, e.g., as a running average over the preceding minute, five minutes, or other time period. The filtering module 406 can determine that a node 302 is a candidate if the performance is within a certain percentage of historical performance, or is no lower than a certain percentage of historical performance. This can reduce the probability of user dissatisfaction or SLE violation, e.g., by reducing the probability of a sudden, sharp drop in performance.

In some examples tracking historical performance, the job-performance criteria can be averages or other statistics computed on performance values. For example, a job-performance value might specify performance of 30±5 fps 100% of the time, and might additionally or alternatively specify performance of 30±1 fps 68% of the time. Historical performance can be tracked over long- or short-term time scales.

In some examples, the filtering module 406 can be configured based on policies set by the cluster operator. This can be done without changing the estimating module 402. Separating the estimating from the filtering permits more flexibly configuring the cluster as workload and capacity change over the course of months or years.

In some examples, coefficients of the regression model 404 can be updated periodically. For example, regression coefficients can be updated faster than an average rate at which jobs leave the machine or faster than an average rate at which the behavior of one or more job(s) changes. For example, if job behavior on a node is, on average, stable over the course of one minute, regression coefficients can be updated every 10 sec. The regression coefficients or other statistical parameters of the performance model (e.g., regression model 404) can be initially determined or can be updated using conventional regression and machine-learning techniques. For example, tree-based regression or linear regression can be used.

In some examples, the modeling module 248 can be configured to update coefficients of the regression model 404, or, in general, to update parameters of statistical models used by the estimating module 402 in determining the performance metrics. In some examples, the modeling module 248 receives the state information or performance data updates from nodes 302, e.g., via the updating module 234. The modeling module 248 can retrieve actual performance and corresponding input variables, such as CPU load, from the performance data. The modeling module 248 can then update the regression model 404 to reflect the retrieved information. In this way, the regression model 404 can be updated as conditions in the nodes 302 change. This can improve accuracy of the performance metrics, reducing the power and cost required to operate additional nodes 302 that would otherwise be provided as a safeguard against negative side-effects of inaccurate estimation. In some examples, each partial feature vector has information about the regression Xs and Ys for a particular app on a particular node 302 at a particular time. In some examples, multiple partial feature vectors for a node can be collected and stored over a period of time, and a curve or surface fit to that collection of data. In some examples, a list of multiple apps, e.g., some or all the apps running on a particular node 302 at a particular time, can be provided along with corresponding performance measurements as input to the regression model. In some examples, the first time a particular app is run, a generic model can be used as input to the regression model or can be used to determine expected resource consumption of the app.

Figure 5:
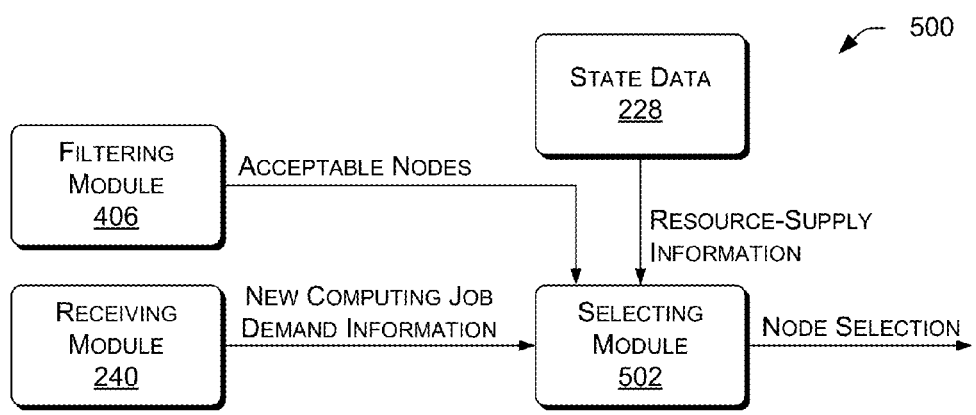
FIG. 5 is a dataflow diagram depicting example module interactions during selection of a computing node to run a computing job.

FIG. 5 is a dataflow diagram 500 illustrating example techniques for selecting candidate computing nodes such as techniques discussed above with reference to FIGS. 2 and 3. A selecting module 502, which can represent the selecting module 244, FIG. 2, can be configured to select the one of the candidate computing nodes 302, FIG. 3, to run a new computing job.

In the illustrated example, the information of the new computing job, e.g., provided by the receiving module 240, includes demand information of one or more resources. The demand information can specify peak or average usage of one or more resource(s) by the new computing job. The demand information can include normalized or absolute values. In an example, the selecting module 502 receives indications of the candidate nodes 302 from the filtering module 242 or 406. The selecting module 502 also receives indications of the available resources on the candidate nodes 302, e.g., by reading the state data 228.

The selecting module 502 can be configured to select one of the candidate computing nodes 302 using scoring techniques such as those described below. In case of a tie between the scores of two candidate computing nodes 302, the selecting module 502 can use any desired tie-breaking algorithm, e.g., round-robin, lowest-ID, least-recently-used, or random selection. In some examples, scores for nodes 302 can be determined to reduce the number of nodes 302 required to execute a given collection of jobs. In other examples, scores for nodes 302 can be determined to reduce the total energy consumed by the nodes 302 while executing the collection of jobs. Accordingly, in some examples, the scores for nodes 302 can be determined or adjusted based in part on information about energy consumption, such as workload-dependent dynamic frequency and voltage scaling (DVFS) parameters.

In some examples, the selecting module 502 can be configured to select one of the candidate computing nodes 302 at random. For example, the selecting module 502 can index a table of the candidate computing nodes 302 with a value from a pseudo-random number generator and select the candidate computing node 302 in the indexed table cell.

In some examples, the selecting module 502 can be configured to select, based at least in part on the demand information, the one of the candidate computing nodes 302 having a least excess capacity with respect to the one or more resources. In some examples, the selecting module 502 can further select the one of the candidate computing nodes 302 based at least in part on stored resource-supply information, e.g., from state data 228. This can reduce fragmentation of resources between nodes 302 in a cluster and thereby reduce the number of nodes 302 required to execute jobs.

For example, denote the M candidate computing nodes 302 as shown in Eq. (1):

$$\{m_i | i = 1 \ldots M\} \quad (1)$$

A computing node $m_i$ has N resources as represented by a vector $s_i$ of supplies as shown in Eq. (2):

$$s_i = \langle s_i^1, s_i^2, \ldots, s_i^N \rangle \quad (2)$$

where $s_i^j$ represents the remaining supply of resource type j (e.g., GPU cycles, CPU cycles, or RAM free) on machine i. The supply (or "capacity") can be expressed in percentage as 100% minus the current usage indicated in the state data 228. The demand d of the new computing job can be expressed as shown in Eq. (3):

$$d_i = \langle d^1, d^2, \ldots, d^N \rangle \quad (3)$$

where $d^j$ represents the amount of resource type j required by the new computing job. Any given $d^j$ value can be zero. The $d^j$ values can be determined, e.g., by regression analysis or other prediction from historical data of job performance. The $d^j$ values can be averages or other representative values for a particular session, application, user, game level, application workflow stage, or any combination thereof. In some examples, estimated resource consumption values can be stored per Application ID.

The selecting module 502 can then determine a packing efficiency score $p_i$ for computing node 302 $m_i$ as the dot product of supply and demand as shown in Eq. (4):

$$p_i = d \cdot s_i \quad (4)$$

In this example, the supply $s_i$ is the supply on node $m_i$ before the new computing job is run. The packing efficiency score can alternatively be computed as shown in Eq. (5):

$$p_i = d \cdot (s_i - n) \quad (5)$$

where n represents the resource needs of the new job. This can permit accounting for additional demand imposed by the new computing job. In some examples, d and n can be determined as outputs of the regression model. In some examples, the supply and demand can be weighted, e.g., as shown in Eq. (6):

$$p_i = \alpha d \cdot \beta s_i \quad (6)$$

where $\alpha$, $\beta$ are scalar weighting factors that can be adjusted to define the relative importance of supply and demand for a particular cluster or node.

Once the $p_i$ scores have been computed for the nodes $m_i$, the selecting module 502 can select one of the computing nodes 302 based on the $p_i$ scores. For example, the $p_i$ scores can be used to rank the nodes 302. For example, the selecting module 502 can select the computing node 302 with the maximum $p_i$ score. This score corresponds to the one of the candidate computing nodes 302 having a greatest excess capacity with respect to the one or more resources required by the new computing job.

In some examples, as noted above, the selecting module 502 can select the one of the candidate computing nodes 302 having a least excess capacity with respect to the one or more resources. Specifically, in this example, the selecting module 502 can select the candidate computing node 302 having the lowest $p_i$ score. This can permit selecting computing nodes 302 that have relatively less supply of highly demanded resources, permitting such resources to be substantially fully utilized rather than fragmented across machines.

For example, suppose that there are two nodes 302, $m_1$ and $m_2$, and two resources X and Y. Table 3 shows example s and d values and the corresponding p values.

TABLE 3

|  | X ($\cdot^1$) | Y ($\cdot^2$) | Packing Efficiency |
|---|---|---|---|
| $S_1$ | 2 | 1 | 13 |
| $S_2$ | 1 | 2 | 11 |
| d | 5 | 3 | |

Since computing node $m_2$ has a lower $p_i$ value, in this example, node $m_2$ is chosen to run the new job. Note that, even though the supply values in this example are numerically lower than the demand values, the filtering module 242 or 406 has already determined that either node can run the new computing job with acceptable performance.

Figure 6:
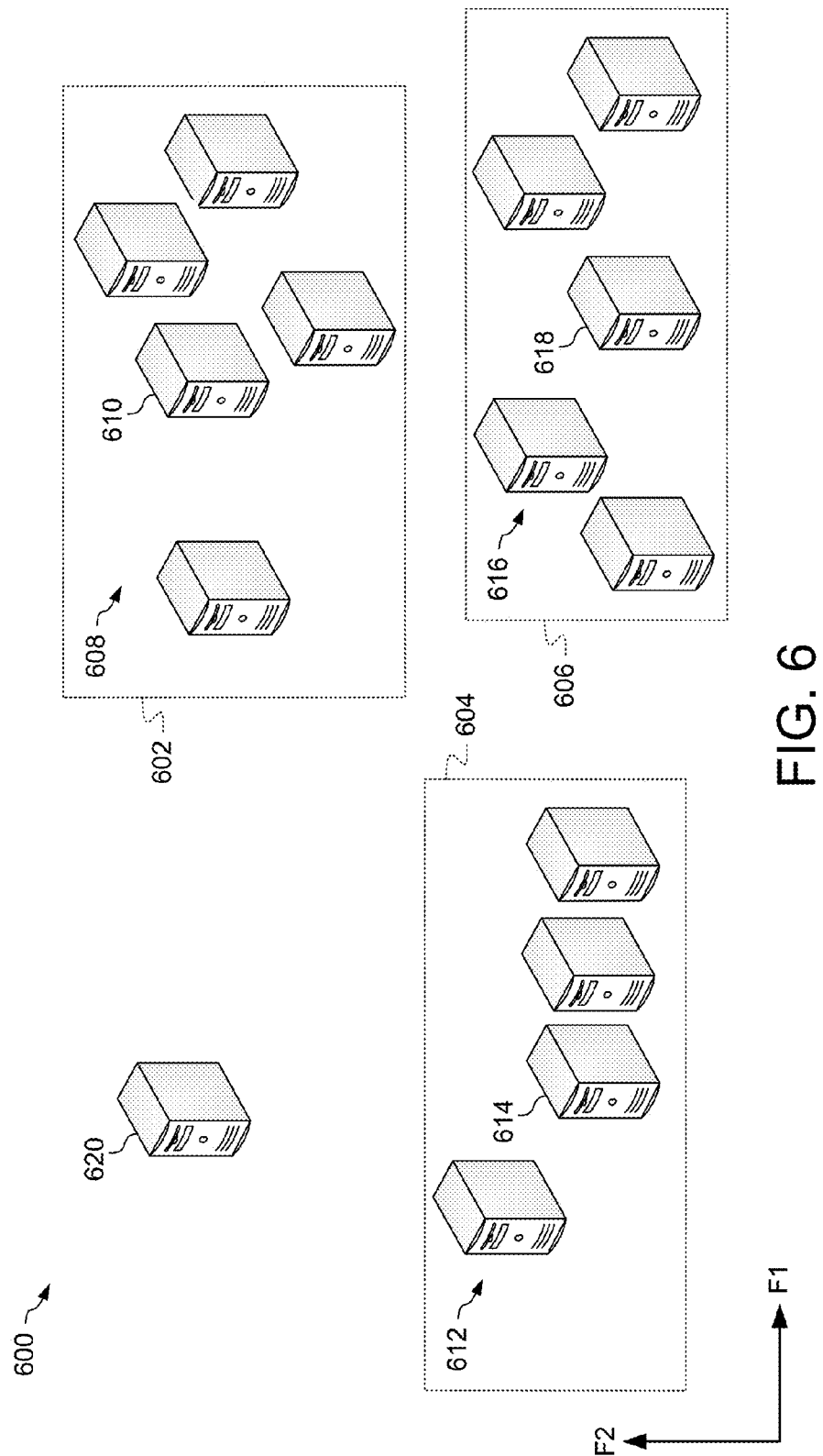
FIG. 6 is a block diagram depicting an example computing cluster implementing sub-clustering.

FIG. 6 shows an example cluster 600 implementing sub-clustering, e.g., as discussed above with reference to the sub-clustering module 236, FIG. 2. The cluster 600 includes three sub-clusters 602, 604, and 606. The sub-cluster 602 includes a plurality of computing nodes 608, of which node 610 is the sub-cluster head node for the sub-cluster 602. The sub-cluster 604 includes a plurality of computing nodes 612, of which node 614 is the sub-cluster head node for the sub-cluster 604. The sub-cluster 606 includes a plurality of computing nodes 616, of which node 618 is the sub-cluster head node for the sub-cluster 606. A CMA 620 assigns the nodes 608, 612, and 616 to the sub-clusters 602, 604, and 606. The CMA 620 can assign or re-assign the nodes during cluster setup and/or during runtime. For brevity, the communications links between and among the CMA 620 and the nodes 608, 612, and 616 are omitted from FIG. 6.

The locations of the nodes 608, 612, and 616 in FIG. 6 graphically represent the properties of those nodes on two feature axes F1 and F2. For example, F1 can be CPU count and F2 can be available network bandwidth. In this example, sub-cluster 604 can be an economy-class sub-cluster used for jobs with relatively low demands. Sub-cluster 606 can be a sub-cluster used for compute-intensive jobs. Sub-cluster 602 can be a premium sub-cluster used for jobs that are both CPU- and network-intensive such as map/reduce jobs. The sub-cluster head nodes 610, 614, and 618 are chosen as representative of the other nodes 608, 612, and 616 in the respective sub-clusters 602, 604, and 606. In examples in which the nodes 608, 612, and 616 in the sub-clusters 602, 604, and 606 are similarly loaded, those nodes can generally exhibit similar response to a given new computing job as does the corresponding sub-cluster head node 610, 614, and 618.

Sub-clusters can be determined based on any number of the types of state information, e.g., those discussed above with reference to Tables 1 and 2. In some examples, sub-clusters can be determined based on all available state information, or all available dynamic state information, except the identification of the new computing job. In some examples, sub-clusters can be determined based on all available state information, or all available dynamic state information, except the identifications of the computing job(s) running on the various nodes 608, 612, and 616, the identification of the new computing job, or a combination thereof. In some examples, sub-clusters can be determined based on portions of the available state information. The portions can be based on selectivity criteria. For example, some regression and other statistical modeling procedures provide an indication of which input variables in a multivariate analysis contribute significantly to determining the response. The selectivity criteria can specify that only input variables having at least a selected level of significance are used in the sub-clustering. For example, as long as some hard drive space is free, the exact amount of free hard drive space is unlikely to significantly affect performance. Accordingly, sub-clustering can be performed without reference to the free hard drive space on the nodes in this example. Reducing the number of variables over which sub-clustering is performed can reduce the time required to assign the nodes 608, 612, and 616 to the sub-clusters 602, 604, and 606.

As discussed above with reference to the sub-clustering module 236, FIG. 2, in some examples, the filtering module 242 determines which of the sub-cluster head nodes 610, 614, and 618 are candidates to run a new computing job. The filtering module 242 then determines candidate nodes from among the nodes 608, 612, and 616 in the sub-clusters 602, 604, and 606 corresponding to the candidate sub-cluster head nodes 610, 614, and 618. In an example, if sub-cluster head node 610 is a candidate for running a new computing job, some or all of the nodes 608 in the corresponding sub-cluster 602 are also determined to be candidates. This advantageously reduces the processing required to determine which nodes 608, 612, and 616 are candidates by a factor roughly proportional to the average number of nodes 608, 612, and 616 in a sub-cluster 602, 604, and 606, saving time and energy on CMA 620. In some examples, individual sub-clusters 602, 604, and 606 can include tens, hundreds, or thousands of nodes 608, 612, and 616.

In some examples, new computing jobs can be identified as certain types of jobs, e.g., based on their performance requirements. Sub-clusters 602, 604, and 606 can also be identified as certain types of sub-clusters (e.g., economy, compute, or premium in the example given above). In these examples, the filtering module 242 can use the sub-cluster types to make an initial or final determination of which of the sub-clusters 602, 604, and 606 can include candidates to run a new computing job of a particular type, and therefore which of the sub-cluster head nodes 610, 614, and 618 to test against the SLEs to select candidate computing nodes.

Illustrative Processes

Figure 7:
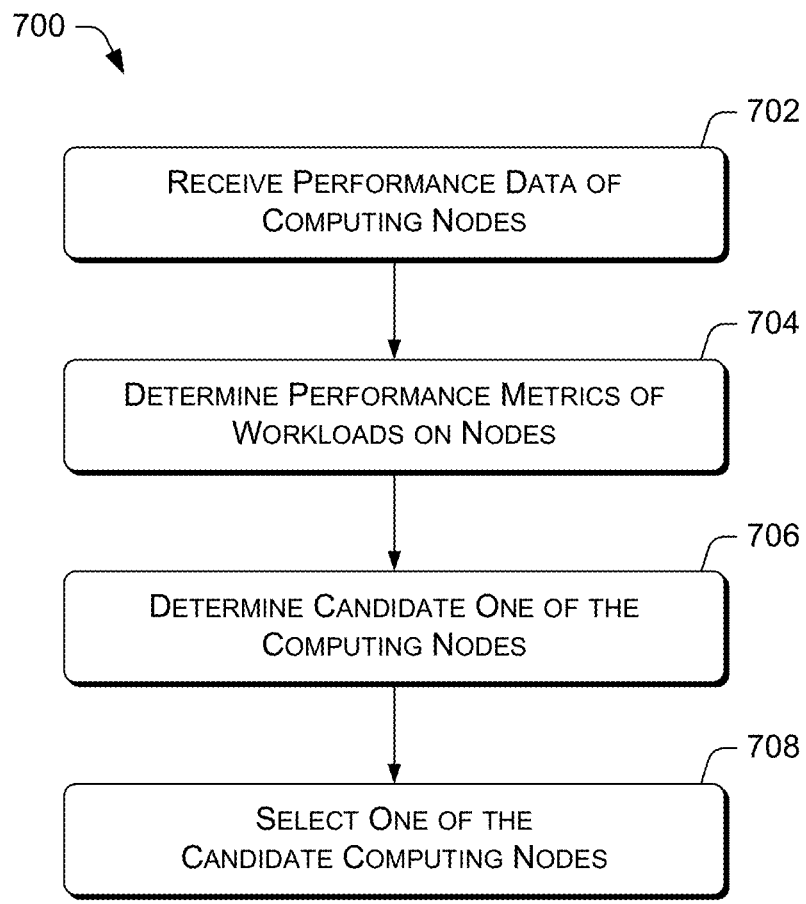
FIG. 7 is a flow diagram that illustrates example processes for selecting a computing node for a new computing job.
Figure 8:
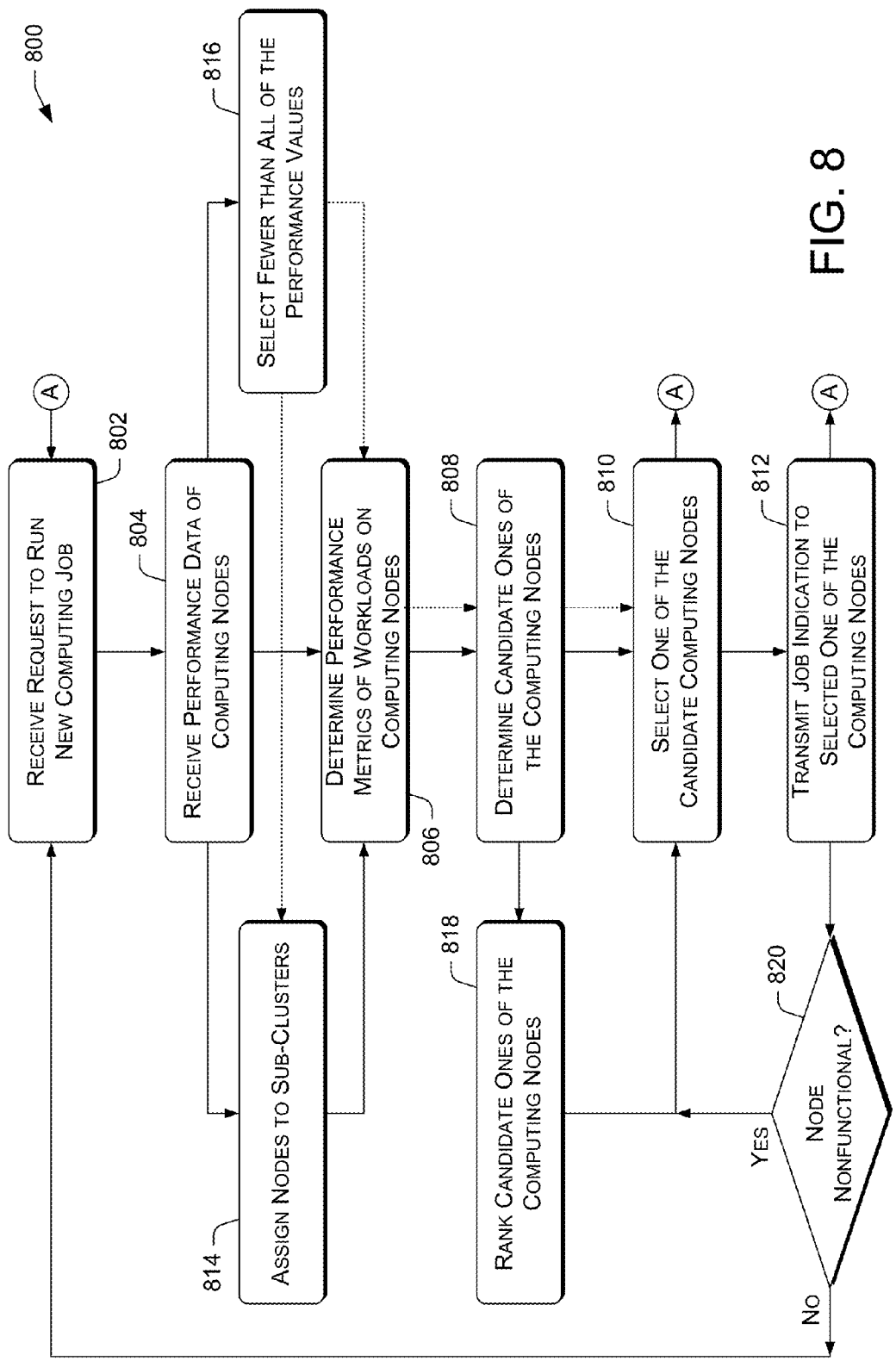
FIG. 8 is a flow diagram that illustrates example processes for selecting a computing node for a new computing job.

FIG. 7 is a flow diagram that illustrates an example process 700 for selecting a computing node for a new computing job. Example functions shown in FIG. 3 and other flow diagrams and example processes herein can be implemented on or otherwise embodied in one or more computing device(s) 102, e.g., a CMA 620, e.g., using software running on such device(s). For the sake of illustration, the example process 700 is described below with reference to processing unit 216 and other components of computing device 200, FIG. 2, that can carry out or participate in the steps of the exemplary method. However, other processing unit(s) such as processing unit 112 and/or other components of computing device(s) 102 or 104 can carry out step(s) of described example processes such as process 700. Similarly, exemplary method(s) shown in FIGS. 7 and 8 are also not limited to being carried out by any specifically-identified components.

The order in which the operations are described in each example flow diagram or process is not intended to be construed as a limitation, and any number of the described operations can be combined in any order and/or in parallel to implement each process. Moreover, the operations in each of FIGS. 7 and 8 can be implemented in hardware, software, and/or a combination thereof. In the context of software, the operations represent computer-executable instructions that, when executed by one or more processors, cause one or more processors to perform the recited operations. In the context of hardware, the operations represent logic functions implemented in circuitry, e.g., datapath-control and finite-state-machine sequencing functions.

At block 702, respective measured performance data of individual ones of a plurality of computing nodes can be received. This can be done as described above with reference to the updating module 234 shown in FIGS. 2, 3, and 4. For example, an HMA process running on one of the computing nodes 302 can provide state information as part of a heartbeat signal.

At block 704, respective performance metrics of respective workloads can be determined on respective ones of a plurality of computing nodes using a statistical model. The workloads can include a new computing job, e.g., a new computing job submitted for execution by a cluster. The respective performance metrics can be determined based at least in part on the respective received measured performance data and information of the new computing job. This can be done as described above with reference to the estimating module 238 shown in FIGS. 2, 3, and 4. For example, the performance metrics can be determined using a regression model as the statistical model. Examples are discussed above with reference to FIG. 4.

In some examples, the statistical model includes a regression model. The determining in block 704 can include determining the respective performance metric for one of the computing nodes by applying at least some of the respective measured performance data and at least some of the information of the new computing job as inputs to the regression model.

At block 706, candidate ones of the computing nodes can be determined based at least in part on the respective performance metrics. This can be done as discussed above with reference to the filtering module 242 shown in FIGS. 2 and 3 or with reference to the filtering module 406 shown in FIG. 4. For example, computing nodes having performance metrics conforming to SLE standards can be determined as candidates.

At block 708, one of the candidate computing nodes can be selected based at least in part on the information of the new computing job. This can be done as discussed above with reference to the selecting module 244 shown in FIGS. 2 and 3. For example, the candidate computing nodes can be sorted according to resource capacity or network latency, and the first node on the list selected to run the job.

In some examples, the selecting in block 708 includes selecting, based at least in part on demand information of the new computing job, the one of the candidate computing nodes having a least excess capacity with respect to one or more resources specified in the demand information. This can be done as discussed above with reference to FIG. 5. For example, dot products can be computed between vectors of available resources for the nodes 302 and a vector of resources needed by the new computing job, and the node corresponding to the dot product with the lowest value can be selected.

FIG. 8 is a flow diagram that illustrates an example process 800 for selecting a computing node for a new computing job.

In some examples, at block 802, a request to run a new computing job can be received, e.g., via a communications interface. This can be done as described above with reference to the receiving module 240 shown in FIGS. 2 and 3. Block 802 can be followed by block 804.

In some examples, at block 804, respective measured performance data of individual ones of a plurality of computing nodes can be received. This can be done as described above with reference to block 702, FIG. 7. For example, data can be received from an HMA.

In some examples, at block 806, respective performance metrics of respective workloads can be determined on respective ones of a plurality of computing nodes using a statistical model. This can be done as described above with reference to block 704, FIG. 7. For example, the performance metrics can be determined using a regression model as the statistical model.

In some examples, at block 808, candidate ones of the computing nodes can be determined based at least in part on the respective performance metrics. This can be done as discussed above with reference to block 706, FIG. 7. For example, computing nodes having performance metrics conforming to SLE standards can be determined as candidates.

In some examples, at block 810, one of the candidate computing nodes can be selected based at least in part on the information of the new computing job. This can be done as discussed above with reference to block 708, FIG. 7. For example, the candidate computing nodes can be sorted according to resource capacity or network latency, and the first node on the list selected to run the job. In some examples, block 810 can be followed by block 802 to process a next request to run a job.

In some examples, block 810 can be followed by block 812. At block 812, an identification of the new computing job can be transmitted to the selected one of the candidate computing nodes, e.g., via a communications interface. In some examples, block 812 can be followed by block 802 to process a next request to run a job.

At block 814, in some examples, using at least some of the measured performance data, individual ones of the computing nodes can be assigned to sub-clusters. Block 814 can follow block 804 and precede block 806. In examples using block 814, block 806 for determining the performance metrics can include determining the performance metrics only for the sub-cluster head nodes. Block 808 for determining candidate ones of the computing nodes can include determining that all the nodes in an individual sub-cluster either are or are not candidates based on the measured performance data for a selected one of the computing nodes in the sub-cluster. In an example discussed above with reference to FIG. 6, the nodes 608 in the sub-cluster 602 can be determined to be candidates or not based on the measured performance data for the corresponding sub-cluster head node 610.

In some examples, the measured performance data includes a plurality of performance values. In these examples, at block 816, fewer than all of the plurality of performance values can be selected using at least one output of the statistical model. In these examples, the determining of performance metrics (block 806) or the assigning into sub-clusters (block 814) can be based at least in part on the selected fewer than all of the plurality of performance values, or the determining of candidates (block 808) or the selecting (block 810) can be based at least in part on the performance metrics selected based at least in part on the selected fewer than all of the plurality of performance values. These examples are graphically represented by the stippled arrows in FIG. 8. Selecting the fewer than all of the plurality of performance values can be done using selectivity criteria, e.g., as discussed above with respect to FIG. 6. For example, the statistical significance of an individual performance value can be output by the statistical model, and only sufficiently significant values used. In an example, GPU load can be significant and total system RAM free cannot be significant for performance of GPU-intensive applications such as demos or shadertoys.

In some examples, at block 818, the candidate computing nodes can be ranked. This can be done, e.g., using $p_i$ scores or in other ways such as those discussed above with reference to FIG. 5. In these examples, the selecting (block 810) can include selecting a highest-ranked or high-ranked one of the ranked candidate computing nodes as the one of the candidate computing nodes. This can be done, e.g., using etags or in other ways such as those discussed above with reference to FIG. 3.

In some examples, at decision block 820, it can be determined whether one of the computing nodes has become nonfunctional. For example, this determination can be made, e.g., by a CMA, if one of the computing nodes does not transmit a heartbeat signal within a required time period. If so, decision block 820 can be followed by block 810. In this way, in response to nonfunctionality of one of the computing nodes, the assigning can be repeated, omitting the nonfunctional one of the computing nodes. If the nodes in the cluster continue to function normally, e.g., if the CMA has received heartbeat signals from the computing nodes within the required time periods, decision block 820 can be followed by block 802 to process a next request to run a job.

Example Clauses

A: A device comprising: one or more computer-readable media having thereon a plurality of modules; and one or more processing units operably coupled to at least one of the computer-readable media, the processing units adapted to execute modules of the plurality of modules comprising: an estimating module configured to determine respective performance metrics of respective workloads on respective computing nodes, wherein the respective workloads include a new computing job and the estimating module is configured to determine the performance metrics based at least in part on respective measured performance data of the ones of the computing nodes and information of the new computing job; a filtering module configured to determine candidate ones of the computing nodes based at least in part on the respective performance metrics; and a selecting module configured to select one of the candidate computing nodes based at least in part on the information of the new computing job.

B: A device as paragraph A recites, wherein the estimating module is configured to determine the respective performance metric for at least one of the computing nodes further based at least in part on a stored regression model having as input at least some of the respective measured performance data.

C: A device as paragraph B recites, wherein the regression model has as input an identifier of the new computing job.

D: A device as paragraph B or C recites, wherein the regression model has as input at least some of the information of the new computing job.

E: A device as any of paragraphs A-D recites, wherein the information of the new computing job includes demand information of one or more resources and the selecting module is further configured to select, based at least in part on the demand information, the one of the candidate computing nodes having a least excess capacity with respect to the one or more resources.

F: A device as any of paragraphs A-E recites, wherein the respective workloads further include one or more respective existing computing jobs and the respective performance metrics include respective performance values corresponding to the new computing job and one or more respective performance values corresponding to respective ones of the existing computing jobs in the respective workload.

G: A device as paragraph F recites, wherein the filtering module is configured to determine the candidate ones of the computing nodes by comparing one or more of the performance values for selected ones of the computing jobs in the respective workloads to respective job-performance criteria.

H: A device as any of paragraphs A-G recites, the plurality of modules further including a sub-clustering module configured to assign individual ones of the computing nodes to respective ones of a plurality of sub-clusters based at least in part on the respective performance metrics of the ones of the computing nodes.

I: A device as paragraph H recites, wherein: the sub-clustering module is further configured to select respective sub-cluster head nodes for individual sub-clusters of the plurality of sub-clusters from the respective computing nodes in the individual sub-clusters; and the filtering module is configured to determine first ones of the candidate ones of the computing nodes from among the sub-cluster head nodes and then to determine second ones of the candidate ones of the computing nodes from the sub-clusters to which the determined first ones of the candidate ones of the computing nodes are assigned.

J: A device as any of paragraphs A-I recites, wherein the selecting module is further configured to select the one of the candidate computing nodes based at least in part on the measured performance data.

K: A device as any of paragraphs A-J recites, wherein the device further includes a communications interface and the plurality of modules further includes a transmission module configured to transmit an indication of the new computing job to the selected one of the candidate computing nodes via the communications interface.

L: A device as any of paragraphs A-K recites, the plurality of modules further including an updating module configured to store updated performance data of at least some of the computing nodes in the computer-readable media, wherein the estimating module is configured to retrieve at least some of the respective measured performance data of the at least some of the computing nodes from the computer-readable media.

M: A device as any of paragraphs A-L recites, wherein the estimating module is configured to determine the respective performance metrics only for respective ones of the computing nodes that meet administrative criteria.

N: A device as paragraph M recites, wherein the administrative criteria include presence on or at the node of specific hardware, e.g., specialized hardware such as an FPGA accelerator or hardware having specific performance characteristics, e.g., a GPU including at least a selected amount of RAM or at least a selected number of cores.

O: A device as paragraph M or N recites, wherein the administrative criteria include access permissions associated with a submitter of the new computing job.

P: A device as any of paragraphs A-O recites, wherein the selecting module is further configured to rank the candidate computing nodes and to select a highest-ranked or high-ranked one of the ranked candidate computing nodes as the one of the candidate computing nodes.

Q: A device as paragraph P recites, wherein the selecting module is further configured to use a select a highest-ranked one of the ranked candidate computing nodes that has an actual workload corresponding to the respective workload.

R: A method, comprising: receiving respective measured performance data of individual ones of a plurality of computing nodes; determining respective performance metrics of respective workloads, the respective workloads including a new computing job, on respective ones of a plurality of computing nodes using a statistical model and based at least in part on the respective received measured performance data and information of the new computing job; determining candidate ones of the computing nodes based at least in part on the respective performance metrics; and selecting one of the candidate computing nodes based at least in part on the information of the new computing job.

S: A method as paragraph R recites, wherein the statistical model includes a regression model and the determining the respective performance metric for one of the computing nodes includes applying at least some of the respective measured performance data and at least some of the information of the new computing job as inputs to the regression model.

T: A method as paragraph R or S recites, wherein the selecting includes selecting, based at least in part on demand information of the new computing job, the one of the candidate computing nodes having a least excess capacity with respect to one or more resources specified in the demand information.

U: A method as any of paragraphs R-T recites, further including assigning, using at least some of the measured performance data, individual ones of the computing nodes to sub-clusters, wherein the determining candidate ones of the computing nodes includes determining that the nodes in individual ones of the sub-clusters are or are not candidate computing nodes based on the measured performance data for a selected one of the computing nodes in the corresponding sub-cluster.

V: A method as paragraph U recites, wherein the measured performance data includes a plurality of performance values, the method further including selecting, using at least one output of the statistical model, fewer than all of the plurality of performance values, wherein the assigning is based at least in part on the selected fewer than all of the plurality of performance values.

W: A method as paragraph U or V recites, further including ranking the candidate computing nodes, wherein the selecting includes selecting a highest-ranked or high-ranked one of the ranked candidate computing nodes as the one of the candidate computing nodes.

X: A method as any of paragraphs R-W recites, wherein the measured performance data includes a plurality of performance values, the method further including selecting, using at least one output of the statistical model, fewer than all of the plurality of performance values.

Y: A method as paragraph X recites, wherein the determining respective performance metrics is based at least in part on the selected fewer than all of the plurality of performance values.

Z: A method as paragraph Y recites, wherein the determining candidate ones of the computing nodes is based at least in part on the performance metrics selected based at least in part on the selected fewer than all of the plurality of performance values.

AA: A method as paragraph Y or Z recites, wherein the selecting one of the candidate computing nodes is based at least in part on the performance metrics selected based at least in part on the selected fewer than all of the plurality of performance values.

AB: A method as any of paragraphs X-AA recites, further including determining that one of the computing nodes has become nonfunctional, and, in response, repeating the determining respective performance metrics, the determining candidate computing nodes, the selecting one of the candidate computing nodes, or the assigning, omitting the one of the computing nodes that has become nonfunctional.

AC: A method as paragraph AB recites, wherein the determining that one of the computing nodes has become nonfunctional includes detecting that a heartbeat signal has not been received within a selected time period.

AD: A computer-readable media having thereon computer-executable instructions, the computer-executable instructions upon execution configuring a computer to perform operations comprising: receiving, via a communications interface, a request to run a new computing job; determining respective performance metrics of respective workloads on respective ones of the computing nodes, wherein the respective workloads include the new computing job and the respective performance metrics are determined based at least in part on the respective state data of the ones of the computing nodes and information of the new computing job; determining candidate ones of the computing nodes based at least in part on the respective performance metrics; and selecting one of the candidate computing nodes based at least in part on the information of the new computing job.

AE: A computer-readable media as paragraph AD recites, the operations further including: transmitting, via the communications interface, an identification of the new computing job to the selected one of the candidate computing nodes; receiving measured performance data from one or more of the computing nodes via the communications interface; and updating the corresponding state data based at least in part on the received measured performance data.

AF: A computer-readable media as paragraph AD or AE recites, wherein the request to run the new computing job includes an identifier of the new computing job and the state data include a regression model having as input the identifier of the new computing job.

AG: A computer-readable medium, e.g., a computer storage medium, having thereon computer-executable instructions, the computer-executable instructions upon execution configuring a computer to perform operations as any of paragraphs R-AC recites.

AH: A device comprising: a processor; and a computer-readable medium, e.g., a computer storage medium, having thereon computer-executable instructions, the computer-executable instructions upon execution by the processor configuring the device to perform operations as any of paragraphs R-AC describe.

AI: A system comprising: means for processing; and means for storing having thereon computer-executable instructions, the computer-executable instructions including means to configure the device to carry out a method as any of paragraphs R-AC describe.

AJ: A system, comprising: means for receiving respective measured performance data of individual ones of a plurality of computing nodes; means for determining respective performance metrics of respective workloads, the respective workloads including a new computing job, on respective ones of a plurality of computing nodes using a statistical model and based at least in part on the respective received measured performance data and information of the new computing job; means for determining candidate ones of the computing nodes based at least in part on the respective performance metrics; and means for selecting one of the candidate computing nodes based at least in part on the information of the new computing job.

AK: A system as paragraph AJ recites, wherein the statistical model includes a regression model and the means for determining the respective performance metric for one of the computing nodes includes means for applying at least some of the respective measured performance data and at least some of the information of the new computing job as inputs to the regression model.

AL: A system as paragraph AJ or AK recites, wherein the means for selecting includes means for selecting, based at least in part on demand information of the new computing job, the one of the candidate computing nodes having a least excess capacity with respect to one or more resources specified in the demand information.

AM: A system as any of paragraphs AJ-AL recites, further including means for assigning, using at least some of the measured performance data, individual ones of the computing nodes to sub-clusters, wherein the means for determining candidate ones of the computing nodes includes means for determining that the nodes in individual ones of the sub-clusters are or are not candidate computing nodes based on the measured performance data for a selected one of the computing nodes in the corresponding sub-cluster.

AN: A system as paragraph AM recites, wherein the measured performance data includes a plurality of performance values, the system further including means for selecting, using at least one output of the statistical model, fewer than all of the plurality of performance values, wherein the means for assigning perform the assigning based at least in part on the selected fewer than all of the plurality of performance values.

AO: A system as paragraph AM or AN recites, further including means for ranking the candidate computing nodes, wherein the means for selecting includes means for selecting a highest-ranked or high-ranked one of the ranked candidate computing nodes as the one of the candidate computing nodes.

AP: A system as any of paragraphs AJ-AO recites, wherein the measured performance data includes a plurality of performance values, the system further including means for selecting, using at least one output of the statistical model, fewer than all of the plurality of performance values.

AQ: A system as paragraph AP recites, wherein the means for determining respective performance metrics determines the respective performance metrics based at least in part on the selected fewer than all of the plurality of performance values.

AR: A method as paragraph AQ recites, wherein the means for determining candidate ones of the computing nodes determines the candidate ones of the computing nodes based at least in part on the performance metrics selected based at least in part on the selected fewer than all of the plurality of performance values.

AS: A method as paragraph AQ or AR recites, wherein the means for selecting one of the candidate computing nodes selects the one of the candidate computing nodes based at least in part on the performance metrics selected based at least in part on the selected fewer than all of the plurality of performance values.

AT: A method as any of paragraphs AP-AS recites, further including means for determining that one of the computing nodes has become nonfunctional, and, in response, repeating the determining respective performance metrics, the determining candidate computing nodes, the selecting one of the candidate computing nodes, or the assigning, omitting the one of the computing nodes that has become nonfunctional.

AU: A method as paragraph AT recites, wherein the means for determining that one of the computing nodes has become nonfunctional includes means for detecting that a heartbeat signal has not been received within a selected time period.

CONCLUSION

Various node-selection and cluster-management techniques described herein can permit more efficiently scheduling and running jobs in a cluster. Various examples can provide more effective packing of jobs on nodes in a cluster, reducing energy consumption of the cluster.

Although the techniques have been described in language specific to structural features or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing device(s) 102, 104, or 200 such as one or more internal or external CPUs or GPUs, and/or one or more pieces of hardware logic such as FPGAs, DSPs, or other types described above.

All of the methods and processes described above can be embodied in, and fully automated via, software code modules executed by one or more general purpose computers or processors. The code modules can be stored in any type of computer-readable storage medium or other computer storage device. Some or all of the methods can be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc., can be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternative implementations are included within the scope of the examples described herein in which elements or functions can be deleted, or executed out of order from that shown or discussed, including substantially synchronously or in reverse order, depending on the functionality involved as would be understood by those skilled in the art. It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A device, comprising:
   one or more processing units; and
   one or more storage devices storing instructions, that when executed by the one or more processing units, cause the device to perform a method comprising:
   determining, for each computing node in a plurality of computing nodes, based at least in part on current measured performance data for the computing node, a performance metric of a workload on that computing node, wherein:
   the respective workload includes:
   the new computing job; and
   an existing computing job;
   determining one or more candidate nodes in the plurality of computing nodes that can process the new computing job based at least in part on the respective performance metrics and information of the new computing job;
   for each computing node that can process the new computing job, comparing an expected performance of the computing node to a threshold to determine if the computing node will meet service level expectations of the existing computing job if the new computing job is processed by the computing node; and
   based on each computing node that will meet the service level expectations, selecting one of the computing nodes to process the new computing job.

2. The device as claim 1 recites, wherein determining the performance metric for the computing node comprises determining the performance metric based at least in part on a stored regression model that receives as input at least some of the current measured performance data and at least some historic measured performance data.

3. The device as claim 2 recites, wherein the regression model further receives as input at least some information of the new computing job and at least some information of the existing computing job.

4. The device as claim 3 recites, wherein:
   the information of the new computing job includes demand information of a resource; and
   selecting one of the computing nodes to process the new computing job comprises selecting one of the computing nodes based at least in part on the information of the new computing job and the demand information, the one of the computing nodes having a least excess capacity with respect to the resource.

5. The device as claim 1 recites, wherein:
   the existing computing job comprises a respective first existing computing job; and
   the workload further includes one or more second existing computing jobs.

6. The device as claim 5 recites, wherein:
each performance metric comprises a first performance value of the new computing job and a second performance value of the respective existing computing job; and
selecting the one of the computing nodes to process the new computing job comprises selecting the one of the computing nodes based at least in part on a comparison of at least one of the first performance value or the second performance value to respective first or second job-performance criteria.

7. The device as claim 1 recites, the method further comprises assigning individual computing nodes in the plurality of computing nodes to respective ones of a plurality of sub-clusters based at least in part on the respective performance metrics of the individual computing nodes.

8. The device as claim 7 recites, wherein the method further comprises:
selecting respective sub-cluster head nodes for individual sub-clusters of the plurality of sub-clusters from the computing nodes in the individual sub-clusters;
determining first ones of the one or more candidate nodes from among the sub-cluster head nodes; and
determining second ones of the one or more candidate nodes from the sub-clusters to which the determined first ones of the one or more candidate nodes are assigned.

9. The device as claim 1 recites, wherein selecting one of the computing nodes to process the new computing job further comprises selecting one of the computing nodes based at least in part on the current and historical measured performance data.

10. The device as claim 1 recites, wherein the device further includes a communications interface configured to transmit an indication of the new computing job to the selected one of the computing nodes.

11. The device as claim 1 recites, wherein the method further comprises storing updated performance data of at least some of the computing nodes in at least one of the one or more computer storage media.

12. A method, comprising:
receiving respective current and historical measured performance data of individual computing nodes in a plurality of computing nodes;
for each computing node in the plurality of computing nodes, determining, based at least in part on information of a new computing job, a performance metric of a workload on the computing node wherein:
the workload includes the new computing job and an existing computing job;
the performance metric is determined using a statistical model and at least a portion of respective current and historical measured performance data; and
the performance metric comprises a first performance value of the new computing job and a second performance value of the existing computing job;
determining one or more candidate nodes in the plurality of computing nodes that can process the new computing job based at least in part on the first and the second performance values;
for each computing node that can process the new computing job, comparing an expected performance of the computing node to a threshold to determine if the computing node will meet service level expectations of the existing computing job if the new computing job is processed by the computing node; and
based on each computing node that will meet the service level expectations, selecting a computing node to process the new computing job.

13. The method as claim 12 recites, wherein the statistical model includes a regression model and the determination of the performance metric for each computing node comprises inputting at least some of the current and historical measured performance data for that computing node, at least some information of the existing computing job on that computing node, and at least some of the information of the new computing job into the regression model.

14. The method as claim 12 recites, further comprising:
receiving demand information of the new computing job, the demand information specifying a resource; and
selecting, the computing node to process the new computing job based on the computing node having a least excess capacity with respect to the resource.

15. The method as claim 12 recites, further comprising assigning, using at least some of the current and historical measured performance data, individual computing nodes in the plurality of computing nodes to sub-clusters, wherein determining the one or more candidate nodes includes determining that the individual computing nodes in the sub-clusters are or are not candidate nodes based on the current and historical measured performance data for a selected one of the computing nodes in the corresponding sub-cluster.

16. The method as claim 15 recites, wherein the current and historical measured performance data includes a plurality of performance values, the method further including selecting, using at least one output of the statistical model, fewer than all of the plurality of performance values, wherein the assigning is based at least in part on the selected fewer than all of the plurality of performance values.

17. The method as claim 15 recites, further comprising ranking the one or more candidate nodes, wherein selecting the computing node to process the new computing job includes selecting a highest-ranked or high-ranked one of the ranked candidate nodes.

18. At least one computer storage device storing instructions, that when executed by at least one processor, cause the processor to perform operations comprising:
receiving, via a communications interface, a request to run a new computing job;
determining, based at least in part on information of the new computing job, performance metrics of a workload on each computing node of one or more computing nodes, wherein:
each workload includes the new computing job and an existing computing job; and
the performance metrics are determined based at least in part on state data associated with the computing node and the information of the new computing job, wherein the state data comprises current performance data and the performance metrics comprise a first performance value of the new computing job and a second performance value of the existing computing job;
determining one or more candidate nodes in the one or more computing nodes that can process the new computing job based at least in part on the performance metrics;
for each computing node that can process the new computing job, comparing for each node, the performance metrics to a threshold to determine if the computing node will meet service level expectations of the existing computing job if the new computing job is processed by the computing node; and based on each computing node that will meet the service level expectations, selecting a computing node to process the new computing job.

19. The at least one computer storage device as claim 18 recites, the operations further including:

transmitting, via the communications interface, an identification of the new computing job to the selected computing node;

receiving, via the communications interface, current measured performance data from at least one the one or more computing nodes; and updating the corresponding state data based at least in part on the received current measured performance data.

20. The at least one computer storage device as claim 18 recites, wherein the request to run the new computing job includes an identifier of the new computing job and the determination of the performance metrics uses a regression model having as input the identifier of the new computing job.

* * * * *